United States Patent
Takaoka et al.

(10) Patent No.: US 11,593,426 B2
(45) Date of Patent: Feb. 28, 2023

(54) INFORMATION PROCESSING APPARATUS AND INFORMATION PROCESSING METHOD

(71) Applicant: SONY CORPORATION, Tokyo (JP)

(72) Inventors: Lyo Takaoka, Tokyo (JP); Yoshinori Matsumoto, Kanagawa (JP); Hiroshi Nakamura, Tokyo (JP); Piljong Kang, Tokyo (JP); Takafumi Kuroki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 192 days.

(21) Appl. No.: 17/047,566

(22) PCT Filed: Feb. 14, 2019

(86) PCT No.: PCT/JP2019/005232
§ 371 (c)(1),
(2) Date: Oct. 14, 2020

(87) PCT Pub. No.: WO2019/207911
PCT Pub. Date: Oct. 31, 2019

(65) Prior Publication Data
US 2021/0149952 A1 May 20, 2021

(30) Foreign Application Priority Data
Apr. 24, 2018 (JP) .............................. JP2018-082763

(51) Int. Cl.
*G06F 16/00* (2019.01)
*G06F 16/635* (2019.01)
(Continued)

(52) U.S. Cl.
CPC ...... *G06F 16/635* (2019.01); *G06F 16/24578* (2019.01); *G06F 16/686* (2019.01);
(Continued)

(58) Field of Classification Search
CPC ............. G06F 16/635; G06F 16/24578; G06F 16/686; H04L 67/306; H04L 67/535; H04W 4/029
See application file for complete search history.

(56) References Cited

U.S. PATENT DOCUMENTS

2008/0271072 A1* 10/2008 Rothschild ........... H04N 21/812
725/35
2009/0141939 A1* 6/2009 Chambers .............. G06V 20/52
382/103
(Continued)

FOREIGN PATENT DOCUMENTS

| JP | 2005-222111 A | 8/2005 |
| JP | 2016-173734 A | 9/2016 |

OTHER PUBLICATIONS

International Search Report and Written Opinion of PCT Application No. PCT/JP2019/005232, dated May 21, 2019, 06 pages of ISRWO.

*Primary Examiner* — Noosha Arjomandi
(74) *Attorney, Agent, or Firm* — Chip Law Group

(57) ABSTRACT

Provided is an information processing apparatus and an information processing method that are capable of providing contents suitable for a user. The information processing apparatus includes an information generation section that refers to information related to an action history and an action schedule of a user acquired and a database of event content information regarding a plurality of events, and generates profile information of the user while tying together information of stay places in past and future of the user and information of artistes of the events, and an output section that sets a priority for each of the plurality of artistes on the basis of the generated profile information, and outputs a content corresponding to each of the artistes in accordance with the priority.

18 Claims, 27 Drawing Sheets

(51) Int. Cl.
*G06F 16/2457* (2019.01)
*G06F 16/68* (2019.01)
*H04L 67/306* (2022.01)
*H04L 67/50* (2022.01)
*H04W 4/029* (2018.01)

(52) U.S. Cl.
CPC .......... *H04L 67/306* (2013.01); *H04L 67/535* (2022.05); *H04W 4/029* (2018.02)

(56) References Cited

U.S. PATENT DOCUMENTS

| | | | |
|---|---|---|---|
| 2011/0075612 A1* | 3/2011 | Guo | H04L 67/55 709/217 |
| 2011/0234504 A1* | 9/2011 | Barnett | G06F 3/04847 345/173 |
| 2012/0046018 A1* | 2/2012 | Bunting | H04L 67/75 455/414.2 |
| 2013/0030645 A1* | 1/2013 | Divine | B60K 35/00 709/217 |
| 2014/0073362 A1* | 3/2014 | Kawata | G06Q 50/01 455/456.3 |
| 2014/0101123 A1* | 4/2014 | Ganesh | G06Q 30/0261 707/723 |
| 2015/0019338 A1* | 1/2015 | Sotomayor | G06Q 30/0261 705/14.55 |
| 2015/0248651 A1* | 9/2015 | Akutagawa | G06F 16/2465 705/7.19 |
| 2016/0255139 A1* | 9/2016 | Rathod | H04N 1/32101 709/203 |
| 2017/0228700 A1* | 8/2017 | Kim | G06Q 10/1095 |
| 2018/0143025 A1* | 5/2018 | Kurata | G01C 21/005 |
| 2018/0174108 A1* | 6/2018 | Kang | G06N 7/005 |
| 2018/0279004 A1* | 9/2018 | Takahashi | H04N 21/4668 |
| 2021/0149952 A1* | 5/2021 | Takaoka | H04L 67/535 |

* cited by examiner

ACTION INFORMATION 700

| DATE AND TIME | PLACE |
| --- | --- |
| 10/5 12:00-12:45 | M Hamburger Shop |
| 10/5 13:00-17:15 | HA CO., LTD. |
| 10/5 17:30-17:45 | Convenience Store YY |
| 10/5 17:55-20:35 | SN DOME |
| 10/9 19:00-21:00 | HK HALL |

CONCERT INFORMATION DATABASE            702

| DATE AND TIME | PLACE | ARTIST NAME |
|---|---|---|
| 10/5 18:00- | AA HALL | RRRR |
| 10/5 18:30- | SN DOME | ABC 55 |
| 10/6 19:00- | Live House C | The LMN |
| 10/6 19:00- | DDD Cafe | Rock DD |
| 10/9 19:00- | HK HALL | N&K |

CONCERT PARTICIPATION INFORMATION 704

| DATE AND TIME | ARTIST NAME | PRIORITY |
|---|---|---|
| 9/25 18:00– | SNY! | UNSET |
| 10/5 18:30– | ABC 55 | UNSET |
| 10/9 19:00– | N&K | UNSET |

FIG. 17

PRIORITY LIST　　　　　　　　　　　　　　　　706

| DATE AND TIME | ARTIST NAME | PRIORITY |
|---|---|---|
| 9/25 18:00– | SNY! | LOW |
| 10/5 18:30– | ABC 55 | MIDDLE |
| 10/9 19:00– | N&K | HIGH |

*FIG. 28*

CONCERT PARTICIPATION INFORMATION       704a

| DATE AND TIME | ARTIST NAME | PRIORITY | TASTE INFORMATION |
|---|---|---|---|
| 9/25 18:00– | SNY! | UNSET | NOT FOND |
| 10/5 18:30– | ABC 55 | UNSET | FOND |
| 10/9 19:00– | N&K | UNSET | UNSET |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/005232 filed on Feb. 14, 2019, which claims priority benefit of Japanese Patent Application No. JP 2018-082763 filed in the Japan Patent Office on Apr. 24, 2018. Each of the above-referenced applications is hereby incorporated herein by reference in its entirety.

TECHNICAL FIELD

The present disclosure relates to an information processing apparatus, an information processing method, and a program.

BACKGROUND ART

These days, a technology that automatically provides a user with music pieces (contents) agreeing with an action history of the user is developed. Examples of such a technology include a technology disclosed in Patent Document 1 below that infers a place where a user stayed for not less than a prescribed time and can automatically provide music pieces in accordance with the result of inference. In detail, the technology disclosed in Patent Document 1 below preferentially infers a place where the time during which a user stayed is long, and provides music pieces on the basis of the inferred place; thus, can provide music pieces according to a place where the user stays daily, for example, a place such as the user's place of employment, school, or house.

CITATION LIST

Patent Document

Patent Document 1: Japanese Patent Application Laid-Open No. 2005-222111

SUMMARY OF THE INVENTION

Problems to be Solved by the Invention

However, the technology disclosed in Patent Document 1 above can provide music pieces (contents) only in accordance with a place where a user stayed for a long time in the past, and has had limitations to providing music pieces suitable for the user.

Thus, in view of the circumstances mentioned above, the present disclosure proposes a new and improved information processing apparatus, a new and improved information processing method, and a new and improved program that are capable of providing contents suitable for a user.

Solutions to Problems

According to the present disclosure, there is provided an information processing apparatus including an information generation section configured to refer to information related to an action history and an action schedule of a user acquired and a database of event content information regarding a plurality of events, and generate profile information of the user while tying together information of stay places in past and future of the user and information of artistes of the events, and an output section configured to set a priority for each of the plurality of artistes on the basis of the generated profile information, and output a content corresponding to each of the artistes in accordance with the priority.

Further, according to the present disclosure, there is provided an information processing apparatus including an information generation section configured to refer to information related to an action history and an action schedule of a user acquired and a database of event content information regarding a plurality of events, and generate profile information of the user while tying together information of stay places in past and future of the user and pieces of attribute information of the events; and an output section configured to set a priority for each of the pieces of attribute information on the basis of the generated profile information, and output a content corresponding to each of the pieces of attribute information in accordance with the priority.

Further, according to the present disclosure, there is provided an information processing method including referring to information related to an action history and an action schedule of a user acquired and a database of event content information regarding a plurality of events, and generating profile information of the user while tying together information of stay places in past and future of the user and information of artistes of the events, and setting a priority for each of the plurality of artistes on the basis of the generated profile information, and outputting a content corresponding to each of the artistes in accordance with the priority.

Further, according to the present disclosure, there is provided a program for causing a computer to execute a function of referring to information related to an action history and an action schedule of a user acquired and a database of event content information regarding a plurality of events, and generating profile information of the user while tying together information of stay places in past and future of the user and information of artistes of the events, and a function of setting a priority for each of the plurality of artistes on the basis of the generated profile information, and outputting a content corresponding to each of the artistes in accordance with the priority.

Effects of the Invention

As described above, according to the present disclosure, an information processing apparatus, an information processing method, and a program that are capable of providing contents suitable for a user can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a diagram showing an example of a priority list 706 according to the first embodiment of the present disclosure.

FIG. 28 is a diagram showing an example of concert participation information 704a according to the second embodiment of the present disclosure.

MODE FOR CARRYING OUT THE INVENTION

Figure 1:
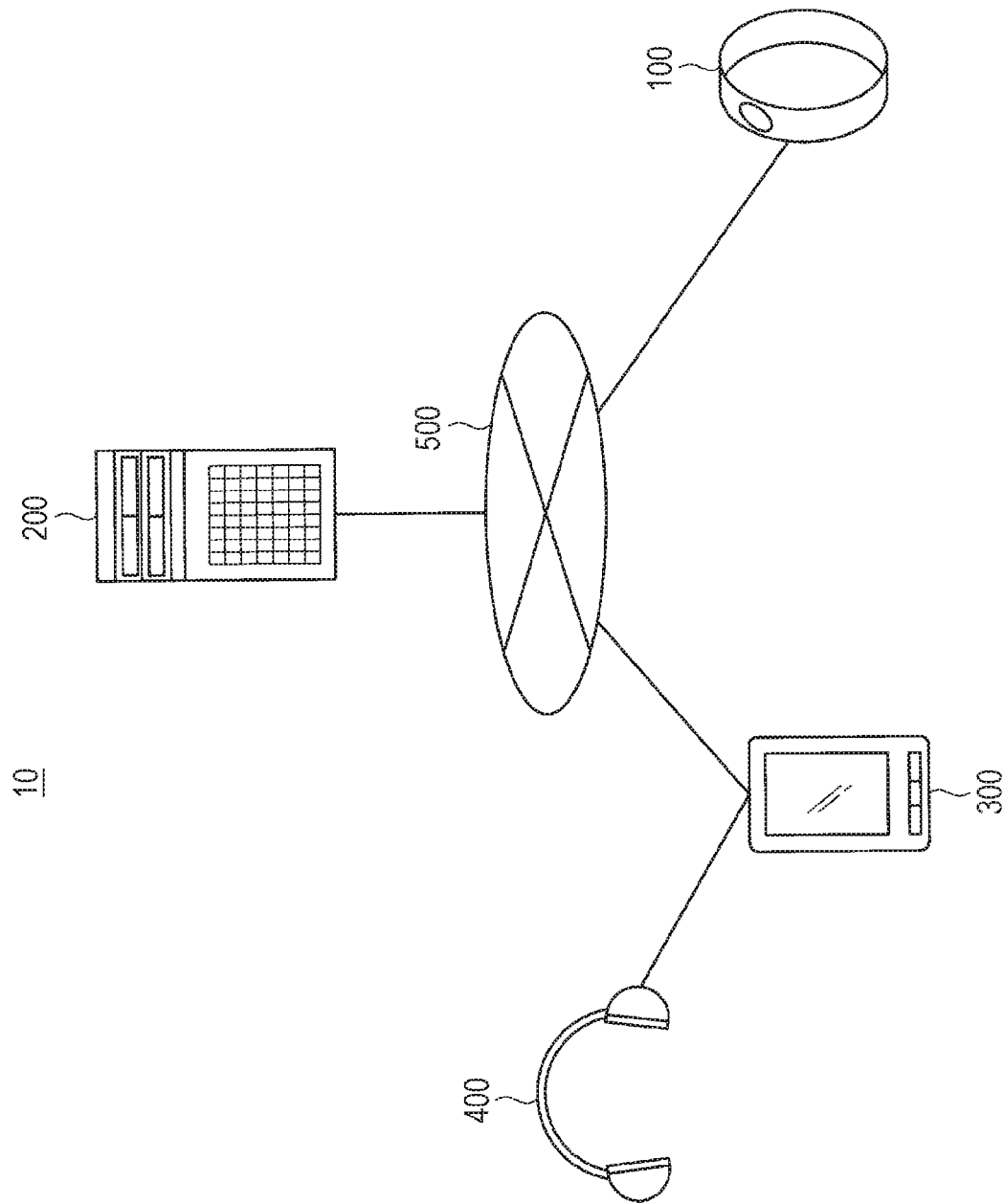
FIG. 1 is a system diagram showing a rough functional configuration of an information processing system 10 according to a first embodiment of the present disclosure.

Hereinafter, (a) preferred embodiment(s) of the present disclosure will be described in detail with reference to the appended drawings. Note that, in this specification and the appended drawings, components that have substantially the same functional configuration are denoted with the same reference numerals, and repeated explanation of these configuration elements is omitted.

Note that, in the present specification and the drawings, configuration elements that have substantially the same or similar functional configuration are sometimes distinguished from each other using different alphabets after the same reference sign. However, in a case there is no need in particular to distinguish configuration elements that have substantially the same or similar functional configuration, the same reference sign alone is attached.

Note that the description is given in the following order.
1. Details of history up to creation of embodiment according to present disclosure 2. First Embodiment 2.1 Rough functional configuration of information processing system 10
2.2 Detailed configuration of detection device 100
2.3 Detailed configuration of server 200
2.4 Detailed configuration of terminal device 300
2.5 Information processing method
  2.5.1 Overall flow
  2.5.2 Stage of generating concert participation information
  2.5.3 Flow of stage of generating playlist, stage of playing music pieces, and stage of playing music pieces
  2.5.4 Stage of acquiring concert participation information
  2.5.5 Stage of performing processing on schedule of concerts
  2.5.6 Stage of performing processing on history of concerts
  2.5.7 Stage of adding music pieces
  2.5.8 Stage of playing music pieces 3. Second Embodiment 3.1 Information processing method
   3.1.2 Stage of generating taste information
   3.1.2 Stage of performing processing on history of concerts
4. Conclusions
5. Hardware configuration
6. Supplements

1. Details of History up to Creation of Embodiment According to Present Disclosure First, before describing an embodiment according to the present disclosure, details of the history up to the creation of an embodiment according to the present disclosure by the present inventors are briefly described.

As described above, these days, a technology that automatically provides a user with music pieces (contents) agreeing with an action history of the user is developed. Examples include a technology that infers a taste of a user on the basis of information of music pieces that the user streamed or purchased in the past and automatically plays music pieces according to the inferred taste information. By such a technology, music pieces suitable for the user can be automatically provided without the user oneself performing troublesome acts such as manipulations for selecting music pieces to be played.

However, the present inventors have considered that a technology like that described above has limitations to providing music pieces suitable for the user. In more detail, the present inventors have considered that selecting music pieces on the basis only of a past action history of the user alone, like in the technology described above, has limitations to selecting music pieces suitable for the situation of the user. Specific examples include a case where the user is planning the first participation in a concert (a recital) of an artist whom the user rarely appreciated music pieces of in the past. In such a case, it is presumed that, if it is possible for the user mentioned above to appreciate a lot of music pieces of the artist mentioned above in advance before the participation in the concert, the possibility that the user can enjoy the concert mentioned above more is increased. However, in a technology like that described above, since the user mentioned above has rarely listened to music pieces of the artist mentioned above, it is difficult to provide the user mentioned above with music pieces of the artist mentioned above preferentially and automatically.

Thus, in view of such a situation, the present inventors have created an embodiment of the present disclosure that is capable of providing the user mentioned above with music pieces of a specified artist in advance preferentially and automatically, that is, is capable of providing music pieces suitable for the user. An embodiment of the present disclosure created by the present inventors provides an information processing apparatus, an information processing method, and a program that are capable of providing music pieces suitable for a user by referring to not only a past action history of the user but also a future action schedule of the user. In the following, embodiments of the present disclosure created by the present inventors are described successively.

Note that, in the following description, examples of embodiments of an information processing apparatus, an information processing method, and a program that are capable of providing music pieces (music) suitable for a user are described; however, the embodiment of the present disclosure is not limited to those that provide music contents. The contents provided by the embodiment of the present disclosure may be, for example, video contents (moving images or still images) of movies, dramas, dances, various performances, sports, etc., and are not particularly limited.

2. First Embodiment

<2.1 Rough Functional Configuration of Information Processing System 10>

First, a rough functional configuration of an information processing system 10 according to a first embodiment of the present disclosure is described with reference to FIG. 1. FIG. 1 is a system diagram showing a rough configuration of the information processing system 10 according to the present embodiment. As shown in FIG. 1, the information processing system 10 according to the present embodiment may include, for example, a detection device 100, a server 200, and a terminal device 300. The detection device 100, the server 200, and the terminal device 300 can communicate with each other via various wired or wireless communication networks 500. Note that the numbers of detection devices 100 and terminal devices 300 included in the information processing system 10 are not limited to the numbers shown in FIG. 1, and may be larger numbers. In the following, an overview of each device included in the information processing system 10 according to the present embodiment is described.

(Detection Device 100)

The detection device 100 may be a carriable device to be carried by the user, such as a smartphone, a wearable device to be mounted on a part of the user's body, such as a piece of eyewear, a piece of wristwear, or a finger ring-type terminal, or an implant device to be implanted in the user's body. The detection device 100 detects the position or state of the user, and transmits the detected information (sensing data) to the terminal device 300 described later. Note that the detection device 100 may be a device integrated with the terminal device 300 described later.

(Server 200)

The server 200 is a computer that manages event content information described later, and transmits event content information stored by itself to the terminal device 300 in accordance with a request by the terminal device 300 described later. The event content information includes information of the dates and times of holding, the places of holding, and artists (artistes, performers, etc.) of various events (concerts, movies, dramas, dances, performances, etc.). Furthermore, the event content information may include information of the titles of events, the genres of events, the subject matters of events (the titles (headings) of performed music pieces (performed music), the genres of music pieces, setlists, etc.), the names of creators (composers, lyric writers, arrangers, authors, scriptwriters, directors, producers, etc.) of created works related to the events, etc. Note that, here, the setlist refers to information in which a list of music pieces to be performed during a concert is arranged in order of performance.

(Terminal Device 300)

The terminal device 300 is a device that can output various contents (music contents or video contents) to the user or can make output control of them. For example, the terminal device 300 may be a mobile terminal (including a mobile phone and a smartphone), a laptop, tablet, or notebook-sized personal computer (PC), a media (music or video) player, or the like. Further, the terminal device 300 may be connected to a headphone speaker 400 that can output voice or a display device (illustration omitted) that can output video.

Note that the terminal device 300 can be obtained by using, for example, a hardware configuration of an information processing apparatus 900 described later. Further, in the present embodiment, the detection device 100 and the terminal device 300 may be an integrated device, or each of the devices described above may not necessarily be obtained by using a single device. For example, each of the devices described above may be obtained by using a plurality of devices that is connected via wired or wireless various networks and cooperates with each other. In the following, detailed configurations of the devices described above are described successively.

<2.2 Detailed Configuration of Detection Device 100>

Figure 2:
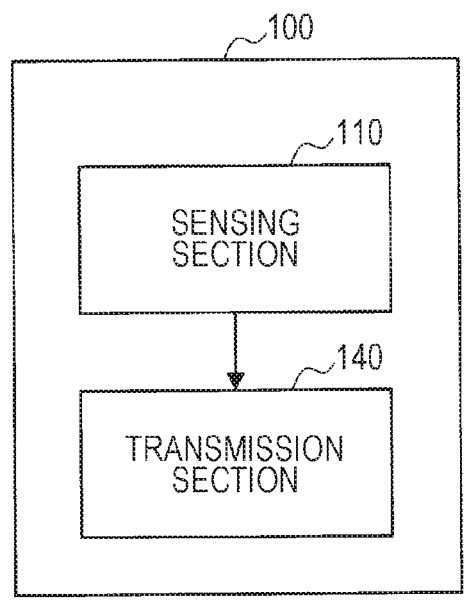
FIG. 2 is a diagram showing a functional configuration of a detection device 100 according to the first embodiment of the present disclosure.

As described above, the detection device 100 according to the present embodiment can detect the position or state of the user, and can transmit the detected information (sensing data) to the terminal device 300 described later. A detailed configuration of the detection device 100 will now be described with reference to FIG. 2. FIG. 2 is a diagram showing a functional configuration of the detection device 100 according to the present embodiment. As shown in FIG. 2, the detection device 100 mainly includes a sensing section 110 and a transmission section 140. In the following, the functional blocks of the detection device 100 are described successively.

(Sensing Section 110)

The sensing section 110 includes at least one sensor that provides sensing data regarding the user. The sensing section 110 outputs generated sensing data to the transmission section 140 described later, and transmits the sensing data to the server 200 by means of the transmission section 140. In detail, for example, the sensing section 110 may include a position sensor that detects information of the position of the user, a living body information sensor that detects living body information of the user, a motion sensor that detects the motion of the user, a sound sensor that detects sound that has occurred around the user, etc. Note that, for example, in a case where the sensing section 110 includes a plurality of sensors, the sensing section 110 may be separated into a plurality of blocks.

Here, the position sensor mentioned above is a sensor that detects the position of the user, etc., and may be specifically a global navigation satellite system (GNSS) receiver or the like. In this case, the position sensor generates sensing data showing the latitude and longitude of the present location of the user on the basis of a signal from a GNSS satellite. Further, for example, a relative positional relationship of the user can be detected from information of a radio frequency identification (RFID), an access point of Wi-Fi, or a wireless base station, or the like; thus, in the present embodiment, such a communication device may be utilized as a position sensor. Note that information included in an action history of the user described later is generated on the basis of, for example, sensing data showing stay places and stay times in the past of the user obtained by the position sensor.

The living body information sensor mentioned above is a sensor that detects the living body information of the user, and may include, for example, a sensor that is mounted directly on a part of the user's body and measures the heart rate, the pulse rate, the blood pressure, the brain waves, the respiration, the perspiration, the myoelectric potential, the temperature of the skin, the electric resistance of the skin, etc. Further, the living body information sensor may include an imaging device; in such a case, the eyeball movement, the size of the pupil diameter, the steady gaze time, etc. of the user may be detected by the imaging device. In the present embodiment, living body information detected by such a living body information sensor may be used when inferring the taste of the user for a concert that the user participated in.

The motion sensor mentioned above is a sensor that detects the motion of the user, and may specifically include an acceleration sensor, a gyro sensor, or the like. In detail, the motion sensor detects changes in acceleration, angular velocity, etc. occurring in association with a motion of the user, and generates sensing data showing the detected changes in these. Further, the motion sensor may include a pressure sensor that detects force applied by a motion of the user (for example, stepping of the user is detected by a pressure sensor provided on a shoe sole of the user), or the like. Then, in the present embodiment, information of the motion of the user detected by such a motion sensor may be used when inferring the taste of the user for a concert that the user participated in.

The sound sensor may be specifically a sound pickup device such as a microphone. The sound sensor can detect environmental sound (including music pieces, etc.) around the user, sound occurring due to a motion of the user such as clapping the hands, etc. Then, in the present embodiment, information of sound detected by such a sound sensor may be used when specifying a concert that the user participated in, or may be used when inferring the taste of the user for a concert that the user participated in.

(Transmission Section 140)

The transmission section 140 can, as described above, transmit sensing data detected by the sensing section 110 to the terminal device 300 described later, and is obtained by using, for example, a communication device that communicates with the terminal device 300 via the communication network 500.

Furthermore, the detection device 100 may include a reception section (illustration omitted) that acquires information such as control information for controlling the sensing section 110. In this case, the reception section is obtained by using, for example, a communication device that communicates with the terminal device 300 via the communication network 500.

<2.3 Detailed Configuration of Server 200>

Figure 3:
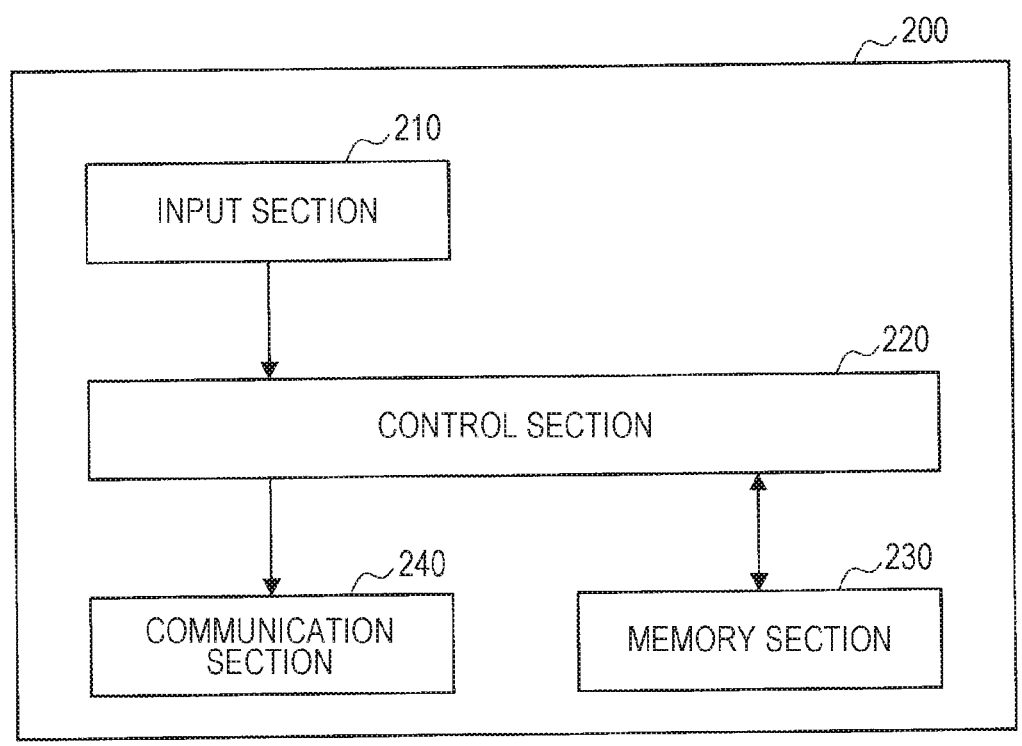
FIG. 3 is a diagram showing a functional configuration of a server 200 according to the first embodiment of the present disclosure.

The server 200 according to the present embodiment is, as described above, a computer that manages event content information, and transmits event content information stored by itself to the terminal device 300 in accordance with a request by the terminal device 300. A detailed configuration of the server 200 will now be described with reference to FIG. 3. FIG. 3 is a diagram showing a functional configuration of the server 200 according to the present embodiment. As shown in FIG. 3, the server 200 may include an input section 210, a control section 220, a memory section 230, and a communication section 240. In the following, the functional blocks of the server 200 are described successively.

(Input Section 210)

The input section 210 is a functional section that accepts the input of event content information, etc. to the server 200, etc., and is obtained by using, for example, a numeric keypad, a keyboard, or the like.

(Control Section 220)

The control section 220 includes, for example, a central processing unit (CPU) or the like as the center; and controls each functional section of the server 200, and can acquire, store, and output event content information.

(Memory Section 230)

The memory section 230 is obtained by using a hard disk drive (HDD) or the like, and stores acquired event content information, etc. For example, in the memory section 230, a concert information database (DB) 702 (see FIG. 10) is stored as event content information. The concert information DB 702 includes, for example, information of the dates and times of holding, the places of holding, and performing artists (artistes) of a plurality of concerts. Furthermore, the concert information DB 702 may include information of setlists including information of the titles of concerts, the genres of concerts (for example, an outdoor concert, an in-store live performance, etc.), the titles (headings) of performed music pieces (performed music), the orders of performance, etc., the genres of music pieces, creators (composers, lyric writers, arrangers, etc.) of music pieces, etc.

(Communication Section 240)

The communication section 240 can transmit, in accordance with a request by the terminal device 300, information of the concert information DB 702 via the communication network 500 or the like, and is obtained by using, for example, a communication device that communicates with the terminal device 300 via the communication network 500. Furthermore, the communication section 240 may acquire information stored in another server (illustration omitted) (for example, information of the expected date and time of holding, the performing artist, etc. of a concert that is stored in another server while being tied to information of the concert venue, or the place of holding, the expected date and time of holding, etc. of a concert that are stored in another server while being tied to information for the artist), and may generate the concert information DB 702 mentioned above to be stored in the memory section 230 mentioned above. Note that, in the present embodiment, the various pieces of information stored in the concert information DB 702 mentioned above are not limited to being acquired from another server via the communication section 240, and may be directly inputted via the input section 210 described above, for example.

<2.4 Detailed Configuration of Terminal Device 300>

Figure 4:
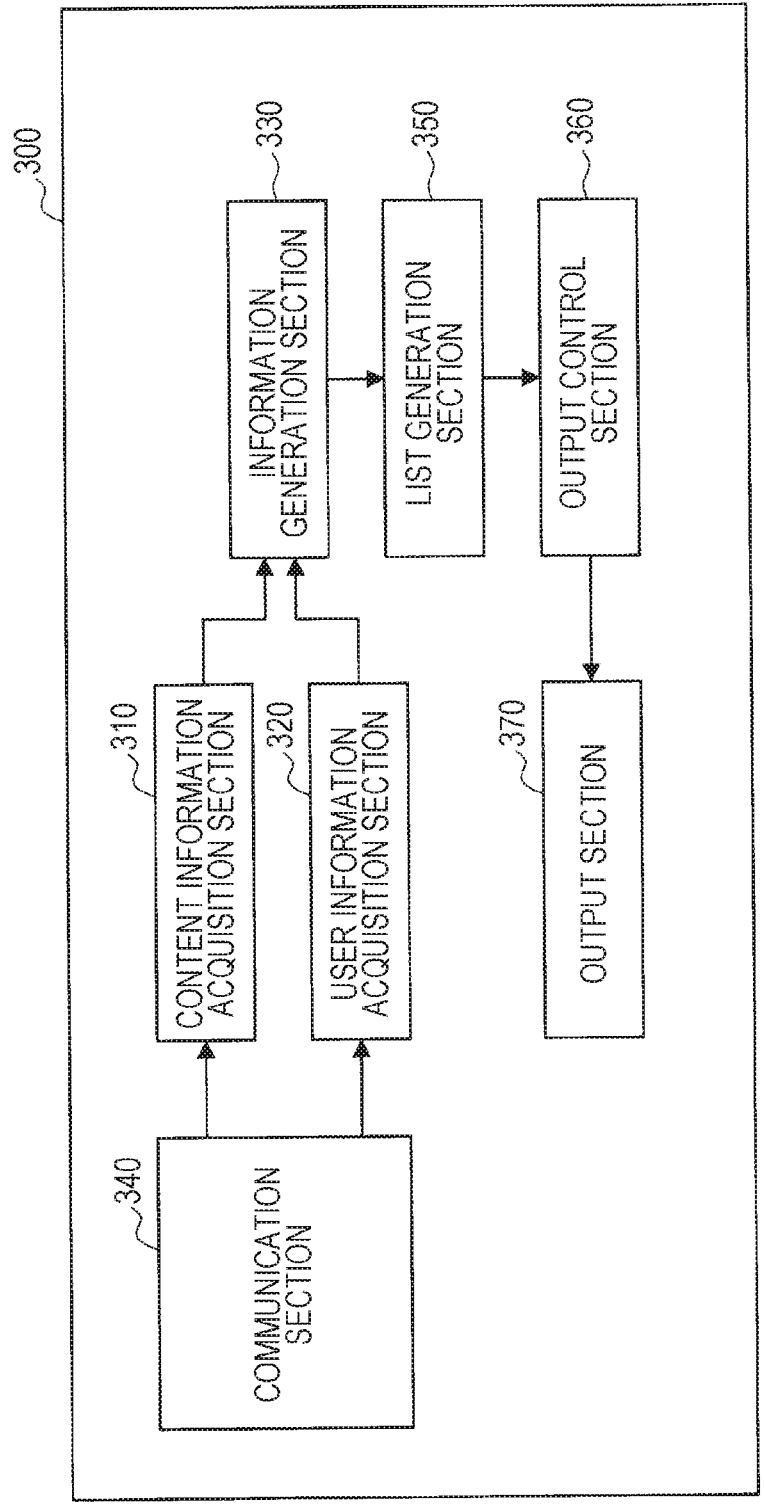
FIG. 4 is a diagram showing a functional configuration of a terminal device 300 according to the first embodiment of the present disclosure.

The terminal device 300 according to the present embodiment is, as described above, a device that can output various contents (music contents or video contents) to the user or can make output control of them. Note that a function of the terminal device 300 may be achieved by, for example, the same device as the detection device 100. Alternatively, in a case where the information processing system 10 according to the present embodiment includes a plurality of detection devices 100, part of them may achieve a function of the terminal device 300. In the following, a detailed configuration of the terminal device 300 according to the present embodiment is described with reference to FIG. 4. FIG. 4 is a diagram showing a functional configuration of the terminal device 300 according to the present embodiment. As shown in FIG. 4, the terminal device 300 may include a content information acquisition section 310, a user information acquisition section 320, an information generation section 330, a communication section 340, a list generation section 350, an output control section 360, and an output section 370. In the following, the functional blocks of the terminal device 300 are described successively.

(Content Information Acquisition Section 310)

The content information acquisition section 310 acquires the concert information DB 702, which is event content information, from the server 200 described above via the communication section 340 described later. Furthermore, the content information acquisition section 310 outputs the acquired concert information DB 702 to the information generation section 330 described later.

(User Information Acquisition Section 320)

The user information acquisition section 320 acquires an action history and an action schedule of the user. For example, the user information acquisition section 320 can acquire information showing stay places and stay times in the past of the user, which is an action history of the user, by acquiring sensing data from the position sensor of the sensing section 110 of the detection device 100 via the communication section 340 described later. Further, the user information acquisition section 320 can acquire an action schedule of the user by schedule information of the user being inputted to the terminal device 300 in advance by the user. Furthermore, the action history and the action schedule of the user acquired by the user information acquisition section 320 are, for example, arranged in the chronological order, and serve as action information 700 (see FIG. 8) including information of past actions and future actions of the user. Further, the user information acquisition section 320 may acquire various pieces of information regarding the user by acquiring sensing data from the living body information sensor, the motion sensor, the sound sensor, etc. of the sensing section 110 of the detection device 100. Then, the user information acquisition section 320 outputs the acquired information (including the action information 700 mentioned above) to the information generation section 330 described later.

(Information Generation Section 330)

The information generation section 330 generates concert participation information 704 of the user (see FIG. 11) as profile information of the user on the basis of the concert information DB 702 outputted from the content information acquisition section 310 and the action information 700 of the user outputted from the user information acquisition section 320. In detail, the information generation section 330 refers to the concert information DB 702, and specifies concerts that the user participated in or is to participate in, from the stay places and stay times in the past and future of the user included in the action information 700 of the user. Next, the information generation section 330 refers to the concert information DB 702, and specifies artists who performed or are to perform in the specified concerts. Then, the information generation section 330 generates concert participation information 704 of the user in which information of the dates and times of holding of concerts that the user participated in or is to participate in and information of artists who are performers of the concerts are stored while being tied together. Furthermore, the information generation section 330 outputs the generated concert participation information 704 to the list generation section 350 described later.

Note that the information generation section 330 may generate concert participation information 704*a* (see FIG. 28) that includes also taste information of the user based on sensing data sent from the living body information sensor, the motion sensor, the sound sensor, etc. of the sensing section 110 of the detection device 100. Furthermore, the taste information mentioned above may be information based on, instead of the sensing data described above, input information that is inputted to the terminal device 300 in advance by the user, for example.

(Communication Section 340)

The communication section 340 is obtained by using a communication device that communicates with the server 200 via the communication network 500, and can receive the concert information DB 702 (see FIG. 10) transmitted from the server 200. Furthermore, the communication section 340 communicates with the detection device 100, and can receive sensing data transmitted from the detection device 100.

(List Generation Section 350)

The list generation section 350 generates a priority list (a priority order) 706 (see FIG. 17) in which a priority is set for each of a plurality of artists, on the basis of the concert participation information 704 (see FIG. 11) sent from the information generation section 330 described above. Then, the generated priority list 706 is used by the output control section 360 described later when controlling the output section 370. In detail, the list generation section 350 sets the priority in such a manner that the priority is higher for an artist of a concert that the user is to participate in in the future and that has the nearest date and time (year, month, and day) with respect to a prescribed point of time (for example, the present time). Alternatively, the list generation section 350 sets the priority in such a manner that the priority is higher for an artist of a concert that the user participated in in the past and that has the nearest date and time with respect to a prescribed point of time. Further, the list generation section 350 may set the priority in such a manner that the priority is higher for an artist of a concert that the user is to participate in in the future or participated in in the past and that has a month and a day corresponding to a prescribed month and day (for example, the user's birthday) or has the nearest month and day with respect to the prescribed month and day mentioned above. Furthermore, the list generation section 350 may set the priority of the artist on the basis of the state of the user or taste information of the user.

(Output Control Section 360)

The output control section 360 controls the output of the output section 370 described later on the basis of the priority list 706 (see FIG. 17) generated by the list generation section 350 described above. In detail, the output control section 360 generates a playlist (illustration omitted) in which the order of playing music pieces (contents) to be played by the output section 370 described later is fixed, on the basis of the priority list 706 mentioned above, and controls the output section 370 in conformity with the generated playlist.

(Output Section 370)

The output section 370 includes a device that can output music pieces or video as contents to the user in conformity with control by the output control section 360. In detail, the output section 370 may be, for example, a voice output device such as a loudspeaker or a headphone, a display device such as a liquid crystal display (LCD) or an organic electro-luminescence (EL) display, or the like.

Furthermore, the terminal device 300 may further include an input section (illustration omitted) that takes in input manipulations by the user. The input section may be, for example, a touch panel provided to be superimposed on the display device mentioned above, a sound pickup device that picks up the user's voice, or the like. Further, for example, the terminal device 300 may change the output (contents, the way of output, etc.) of the output section 370 on the basis of an input manipulation taken in by the input section mentioned above.

Note that each of the content information acquisition section 310, the user information acquisition section 320, the information generation section 330, the list generation section 350, and the output control section 360 described above is obtained by using, for example, a central processing unit (CPU) or the like in a software manner. Further, part or all of the functions of the server 200 described above may be achieved by using the terminal device 300.

Hereinabove, a rough configuration of the information processing system 10 according to the present embodiment and a detailed configuration of each device included in the information processing system 10 are described. Note that the configuration of the information processing system 10 is not limited to the example mentioned above, and may be variously modified. For example, as described above, part or all of the functions of the server 200 may be achieved by using the terminal device 300. Specifically, for example, in a case where all the functions of the server 200 are achieved by using the terminal device 300, the information processing system 10 may not necessarily include the server 200. Furthermore, in a case where the detection device 100 and the terminal device 300 are obtained by using the same device, the information processing system 10 may be completed in the interior of the device. Further, part or all of the functions of the terminal device 300 may be achieved by using the server 200 or another server (illustration omitted) on the communication network 500. In this case, the information processing system 10 may not necessarily include the terminal device 300.

<2.5 Information Processing Method>

(2.5.1 Overall Flow)

Figure 5:
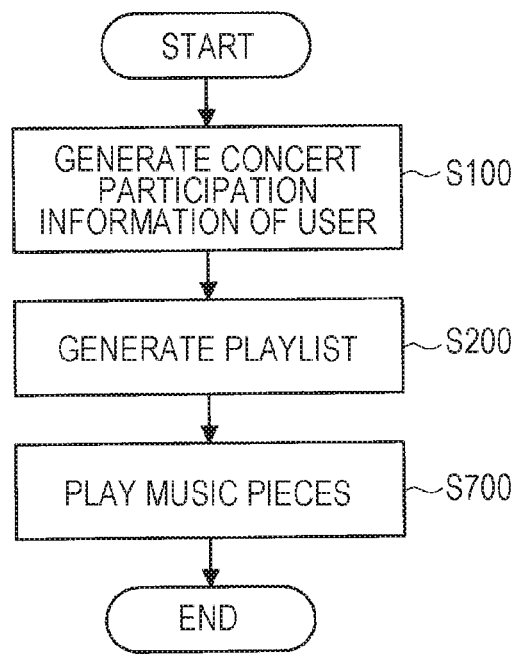
FIG. 5 is a flow chart of the entirety of an information processing method according to the first embodiment of the present disclosure.

Next, an information processing method in the first embodiment of the present disclosure is described. First, a rough flow of an information processing method in the present embodiment is described with reference to FIG. 5. FIG. 5 is a flow chart of the entirety of an information processing method according to the present embodiment. As shown in FIG. 5, the information processing method according to the present embodiment may mainly include three steps of step S100, step S200, and step S700. In the following, each of these steps is briefly described.

Step S100

Figures 9, 10:
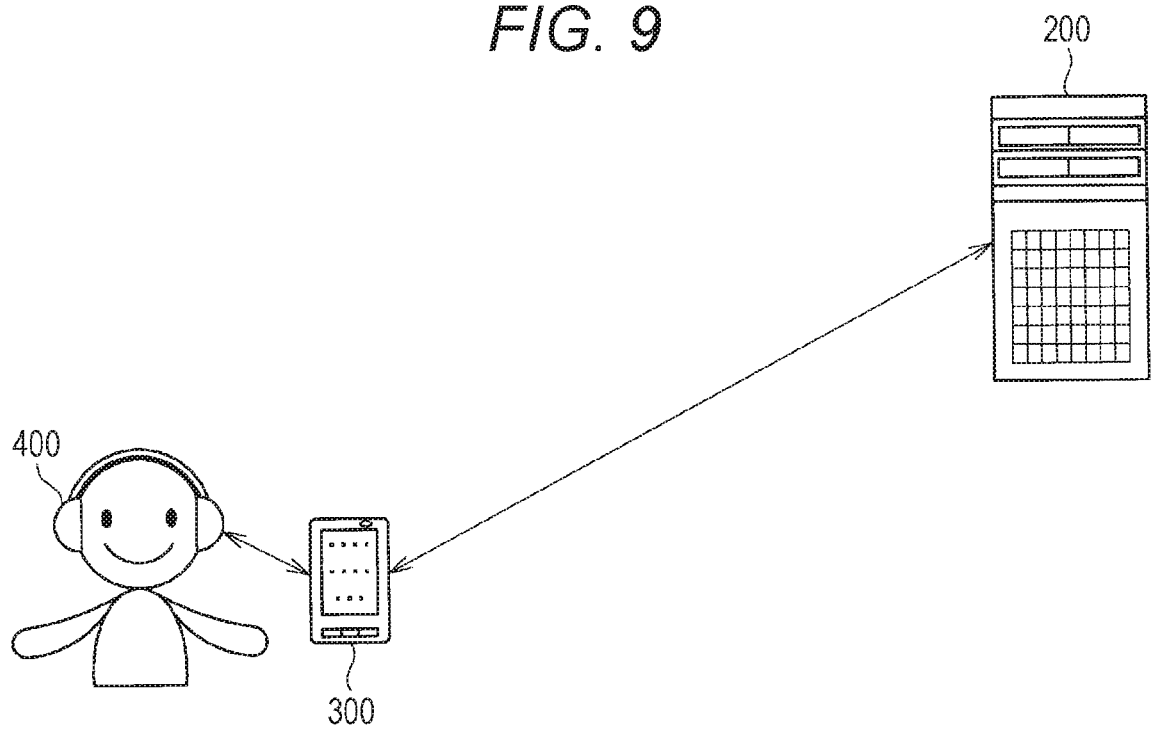
FIG. 9 is an explanatory diagram (part 2) for describing the stage of generating concert participation information of the information processing method according to the first embodiment of the present disclosure.
FIG. 10 is a diagram showing an example of a concert information DB 702 according to the first embodiment of the present disclosure.

First, in step S100, the terminal device 300 generates concert participation information 704 of the user (see FIG. 11) on the basis of action information 700 of the user (see FIG. 8) and the concert information DB 702 (see FIG. 10). In the following description, the step S100 is referred to as "a stage of generating concert participation information".

Step S200

Next, in step S200, the terminal device 300 generates a playlist (illustration omitted) in which the order of playing music pieces is fixed, on the basis of the concert participation information 704 (see FIG. 11) generated in step S100 described above. In the following description, the step S200 is referred to as "a stage of generating a playlist".

Step S700

Then, in step S700, the terminal device 300 plays music pieces on the basis of the playlist (illustration omitted) generated in step S100 described above. In the following description, the step S700 is referred to as "a stage of playing music pieces".

Furthermore, details of "the stage of generating concert participation information (step S100)", "the stage of generating a playlist (step S200)", and "the stage of playing music pieces (step S700)" in the information processing method according to the present embodiment are described.

(2.5.2 Stage of Generating Concert Participation Information)

First, an information processing method in "the stage of generating concert participation information (step S100)" of the information processing method according to the present embodiment is described with reference to FIG. 6 to FIG. 11.

Figure 6:
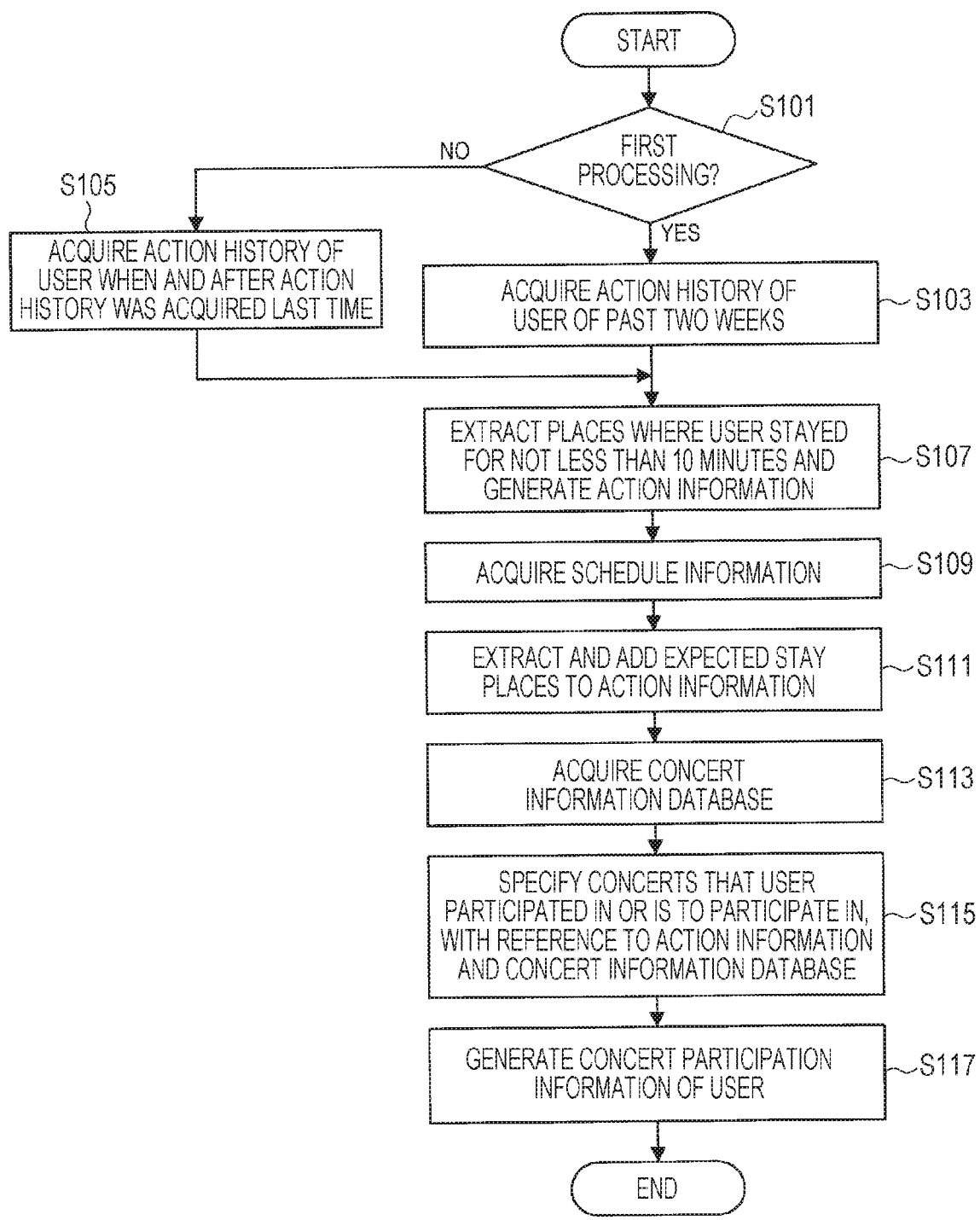
FIG. 6 is a flow chart of a stage of generating concert participation information of the information processing method according to the first embodiment of the present disclosure.
Figures 7, 8:
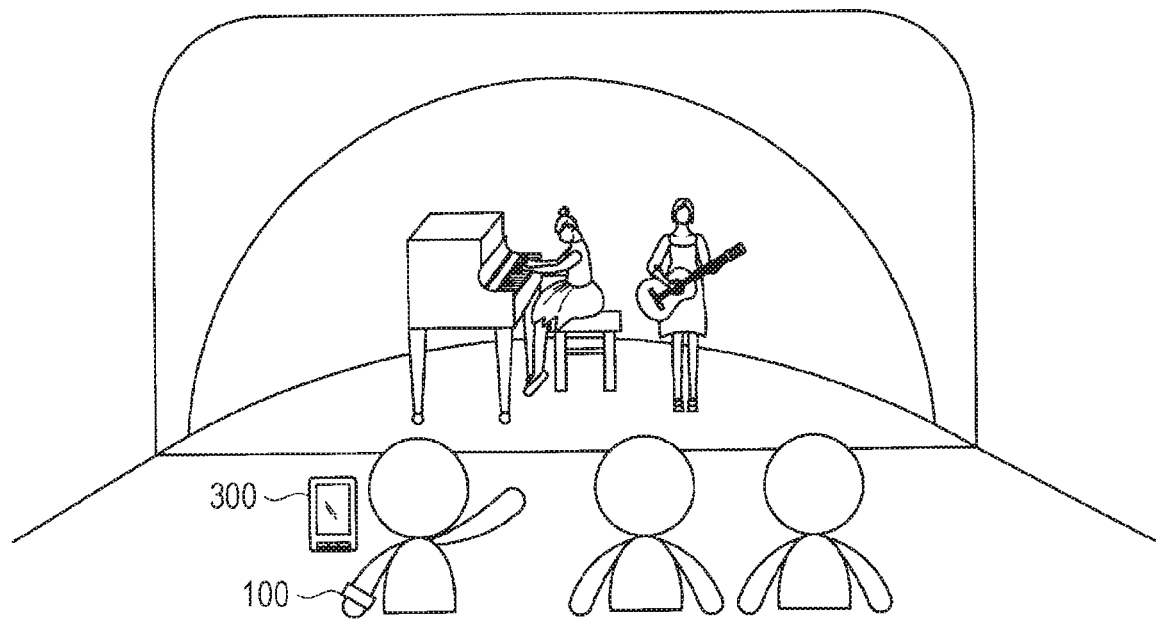
FIG. 7 is an explanatory diagram (part 1) for describing the stage of generating concert participation information of the information processing method according to the first embodiment of the present disclosure.
FIG. 8 is a diagram showing an example of action information 700 according to the first embodiment of the present disclosure.
Figures 11, 12:
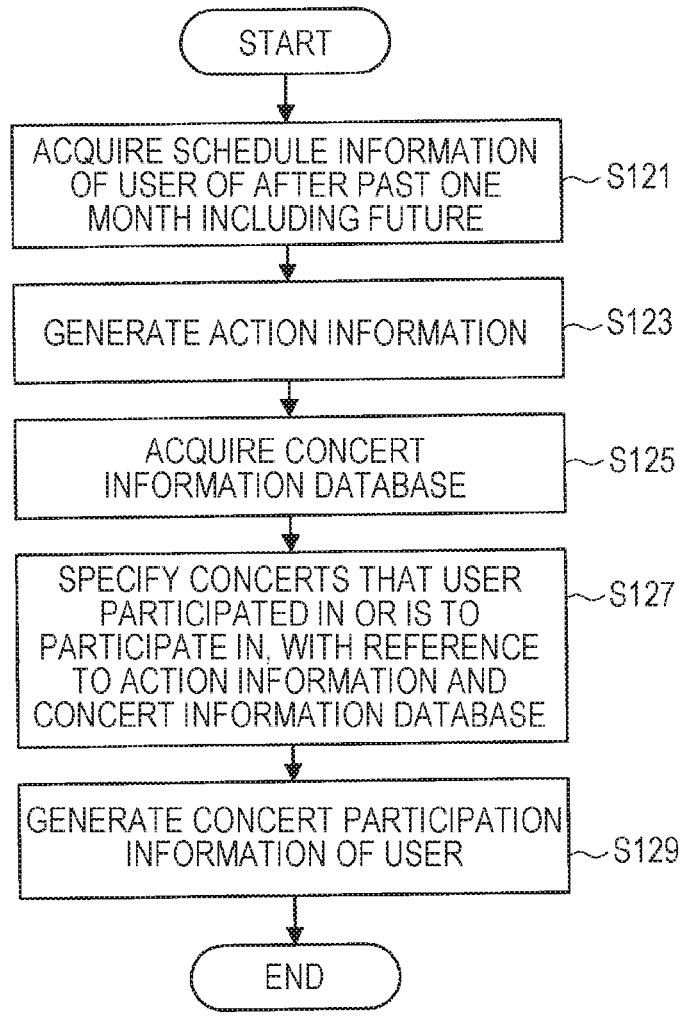
FIG. 11 is a diagram showing an example of concert participation information 704 according to the first embodiment of the present disclosure.
FIG. 12 is a flow chart of a stage of generating concert participation information of an information processing method according to a modification example of the first embodiment of the present disclosure.

FIG. 6 is a flow chart of "the stage of generating concert participation information" of the information processing method according to the present embodiment. FIG. 7 and FIG. 9 are explanatory diagrams for describing "the stage of generating concert participation information" of the information processing method according to the present embodiment. FIG. 8 is a diagram showing an example of action information 700 according to the present embodiment. FIG. 10 is a diagram showing an example of the concert information DB 702 according to the present embodiment. Furthermore, FIG. 11 is a diagram showing an example of concert participation information 704 according to the present embodiment.

As shown in FIG. 6, "the stage of generating concert participation information" may include a plurality of steps of step S101 to step S117. In the following, details of each of these steps are described.

Note that it is assumed that "the stage of generating concert participation information" is, for example, executed once or several times a day, periodically at times set in advance.

Step S101

The terminal device 300 assesses whether or not the processing of "the stage of generating concert participation information" is the first processing. The terminal device 300 goes to step S103 described later in a case of the first processing, or goes to step S105 in a case of not the first processing.

Step S103

The terminal device 300 acquires an action history of the user of a prescribed period (for example, the past two weeks with the present time as a standard). For example, an action history of the user (stay places and stay times in the past of the user) can be acquired by, as shown in FIG. 7, the position sensor included in the sensing section 110 of the detection device 100 (in FIG. 7, it is assumed that, for example, the user stays in a concert hall and is appreciating a concert).

Step S105

The terminal device 300 acquires an action history of the user when and after an action history was acquired last time, in a similar manner to step S103 described above.

Step S107 The terminal device 300 extracts, from the action history acquired in step S103 or step S105 described above, information of places where the user stayed for not less than a prescribed time (for example, 10 minutes) and information of the stay times, and generates action information 700 like that shown in FIG. 8. As shown in FIG. 8, in the action information 700, information of past actions of the user (stay places and stay times) is stored in the chronological order. Note that FIG. 8 shows an example in a case where the information of up to October 5 is information of past actions of the user.

Step S109

The terminal device 300 acquires schedule information of the user. The schedule information is information of a future action schedule of the user (expected stay places and expected stay times), and is acquired by being inputted to the terminal device 300 by the user.

Step S111

The terminal device 300 extracts a future action schedule of the user (expected stay places and expected stay times) from the schedule information acquired in step S109 described above, and adds the future action schedule of the user to the action information 700 (see FIG. 8) generated in step S107. Note that, at this point of time, the information extracted from the action history in step S107 and schedule information acquired in step S111 in processing in the past may overlap in the action information 700. Further, FIG. 8 shows an example in a case where the information of from October 6 is information of the future action schedule of the user.

Step S113

The terminal device 300 acquires the concert information DB 702 from the server 200, as shown in FIG. 9. For example, as shown in FIG. 10, information of, for example, the dates and times of holding, the places of holding, and performing artists of a plurality of concerts is included in the concert information DB 702. Furthermore, the concert information DB 702 may include information of setlists including information of the titles of concerts, the titles (headings) of performed music pieces (performed music), the orders of performance, etc., creators (composers, lyric writers, arrangers, etc.) of music pieces, etc.

Step S115

The terminal device 300 specifies concerts that the user participated in or is to participate in, on the basis of the concert information DB 702 and the stay places and stay times in the past and future of the user included in the action information 700.

Step S117

The terminal device 300 specifies artists who performed in the concerts specified in step S115. Furthermore, the terminal device 300 generates concert participation information 704 like that shown in FIG. 11. In the concert participation information 704, information of the dates and times of holding of concerts that the user participated in or is to participate in and information of artists who performed or are to perform in the concerts are stored while being tied to each other. Note that, although a column for storing information of priorities that are to be set in "the stage of generating a playlist (step S200)" described later exists in the concert participation information 704 shown in FIG. 11, it is assumed that the priorities are not set at this point of time. Furthermore, in the step S117, the terminal device 300 may perform processing of preventing the registration of redundant information and, in a case where information acquired before has been updated, updating the information. Then, the terminal device 300 ends the processing.

Note that the concert participation information 704 of the user thus generated may be displayed on the terminal device 300 in accordance with a request by the user. The concert participation information 704 of the user is information regarding concerts that the user has so far experienced and concerts that the user is to experience in the future, and can therefore be valuable information to the user as a "live history". Furthermore, the terminal device 300 may store, in the concert participation information 704, memo information inputted by the user (information of the impressions of concerts, the names of friends who participated together, etc.).

As hereinabove, "the stage of generating concert participation information" of the present embodiment can perform processing for generating concert participation information 704 that is used to select music pieces suitable for the user. The concert participation information 704 includes not only a past action history of the user but also a future action schedule of the user; thus, by using the concert participation information 704 in processing described later, music pieces suitable for the user can be selected on the basis of the future action schedule.

Note that, in the present embodiment, the processing of "the stage of generating concert participation information" may be modified. For example, in the present embodiment, concert participation information 704 may be generated on the basis of schedule information inputted from the user, instead of an action history of the user based on sensing data of the position sensor of the sensing section 110 of the detection device 100. Such a modification example will now be described with reference to FIG. 12. FIG. 12 is a flow chart of "the stage of generating concert participation information" of an information processing method according to a modification example of the present embodiment. As shown in FIG. 12, "the stage of generating concert participation information" according to the present modification example may include a plurality of steps of step S121 to step S129. In the following, details of each step according to the present modification example are described. Note that, in the following description, only different points from "the stage of generating concert participation information" of the present embodiment shown in FIG. 6 described above are described, and a description of points shared by the present embodiment is omitted.

Step S121

The terminal device 300 acquires schedule information of the user of a prescribed period (for example, the past one month and the future with the present time as a standard).

Step S123

The terminal device 300 extracts, from the schedule information acquired in step S121 described above, date and time and place information (times when the user stayed or times when the user is to stay, and places where the user stayed or places where the user is to stay), and generates action information 700.

Step S125 to Step S129

These steps are similar to step S113 to step S117 described above, and therefore a description is omitted herein.

Note that, in the present embodiment, an action history of the user (in detail, information of concerts that the user participated in) may be acquired in the following manner. For example, the terminal device 300 collects, from the sound sensor provided as the sensing section 110 of the detection device 100, voice data of sound that has occurred around the user, together with collected information of the times. Here, it is assumed that the sound of music pieces that were performed in concerts that the user participated in is included in the collected sound. Then, the terminal device 300 refers to a setlist included in the concert information DB 702 acquired from the server 200, on the basis of the collected voice data and the collected information of the times; thereby, can specify concerts that the user participated in. Thus, by using the voice data, the terminal device 300 can acquire information of concerts that the user participated in.

(2.5.3 Flow of Stage of Generating Playlist, Stage of Playing Music Pieces, and Stage of Playing Music Pieces)

Figure 13:
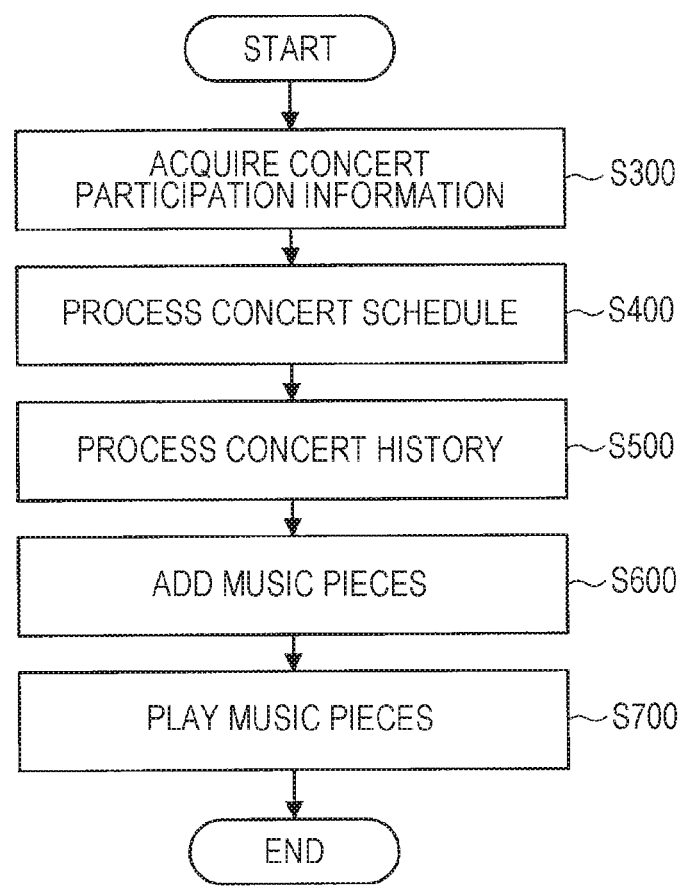
FIG. 13 is a flow chart of the entirety of a stage of generating a playlist and a stage of playing music pieces according to the first embodiment of the present disclosure.

Next, a rough flow of "the stage of generating a playlist (step S200)" and "the stage of playing music pieces (step S700)" in the information processing method in the present embodiment is briefly described with reference to FIG. 13. FIG. 13 is a flow chart of the entirety of "the stage of generating a playlist" and "the stage of playing music pieces" according to the present embodiment. As shown in FIG. 13, "the stage of generating a playlist" and "the stage of playing music pieces" include a plurality of steps of step S300 to step S700. In the following, each of these steps is briefly described.

Note that "the stage of generating a playlist" and "the stage of playing music pieces" are started in a case where the user has made a manipulation of instructing the terminal device 300 to play music pieces.

Step S300

First, in step S300, the terminal device 300 acquires the concert participation information 704 of the user generated in step S100 described above. In the following description, the step S300 is referred to as "a stage of acquiring concert participation information".

Step S400

Next, in step S400, the terminal device 300 performs processing on a concert schedule that is future information included in the concert participation information 704 with the present time as a standard, and sets the priorities of artists related to the concert schedule. In the following description, the step S400 is referred to as "a stage of processing a concert schedule".

Step S500

Next, in step S500, the terminal device 300 performs processing on a concert history that is past information included in the concert participation information 704 with the present time as a standard, and sets the priorities of artists related to the concert history. In the following description, the step S500 is referred to as "a stage of processing a concert history".

Step S600

Next, in step S600, the terminal device 300 adds music pieces to the playlist (illustration omitted) in which the order of playing music pieces is fixed, on the basis of the priorities that are set in step S400 and step S500 described above. In the following description, the step S600 is referred to as "a stage of adding music pieces".

Step S700

Then, in step S700, as described above, the terminal device 300 plays music pieces on the basis of the playlist (illustration omitted) generated in step S600 described above. In the following description, the step S700 is referred to as "a stage of playing music pieces".

Furthermore, details of "the stage of acquiring concert participation information (S300)", "the stage of processing a concert schedule (step S400)", "the stage of processing a concert history (step S500)", "the stage of adding music pieces (S600)", and "the stage of playing music pieces (step S700)" in the information processing method according to the present embodiment are described successively.

(2.5.4 Stage of Acquiring Concert Participation Information)

Figure 14:
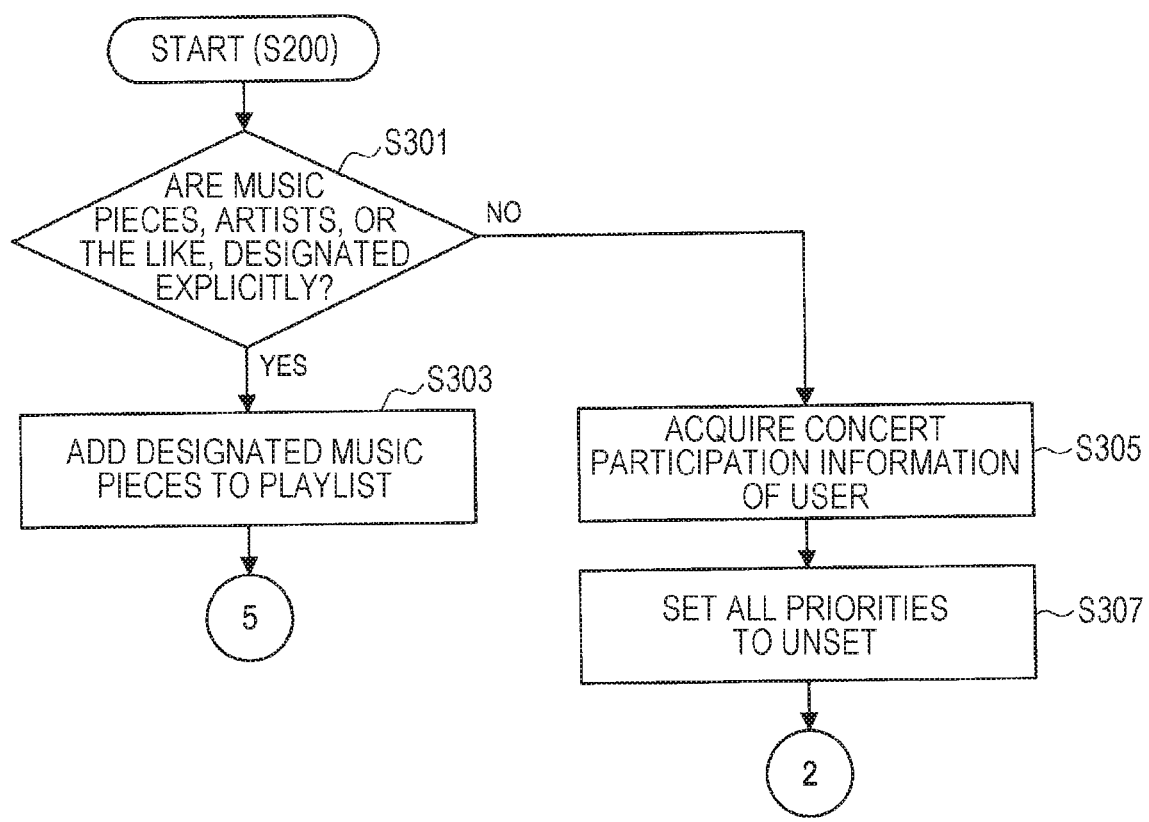
FIG. 14 is a flow chart of a stage of acquiring concert participation information according to the first embodiment of the present disclosure.

First, an information processing method in "the stage of acquiring concert participation information (S300)" of the information processing method according to the present embodiment is described with reference to FIG. 14. FIG. 14 is a flow chart of "the stage of acquiring concert participation information" according to the present embodiment. As shown in FIG. 14, "the stage of acquiring concert participation information" may include a plurality of steps of step S301 to step S307. In the following, details of each of these steps are described. Herein, in a case where the user explicitly designates music pieces or artists when the user has made an instruction to play music pieces, processing of playing the designated music pieces is performed; however, in a case where there is no specific designation of music pieces, such as a case of "play music", processing like that described below is executed.

Note that the following processing is started in a case where the user has made a manipulation of instructing the terminal device 300 to play music.

Step S301

The terminal device 300 assesses whether or not it has accepted, from the user, an explicit designation input that designates music pieces to be played, such as music pieces or artists. The terminal device 300 goes to step S303 in a case where it has accepted an explicit designation input like that described above, or goes to step S305 in a case where it has not accepted an explicit designation input.

Step S303

The terminal device 300 adds the designated music pieces (or music pieces of the designated artists) to the playlist (illustration omitted) in conformity with the instruction accepted in step S301 described above, and goes to step S700 ("the stage of playing music pieces") described later.

Step S305

The terminal device 300 acquires the concert participation information 704 of the user generated in step S100.

Step S307

The terminal device 300 sets the priority of each artist in the concert participation information 704 of the user to unset, and goes to step S400 ("the stage of processing a concert schedule") described later. That is, in the step S307, the information of priority used to fix the order of playing is initialized for the music pieces or the artists.

Figure 15:
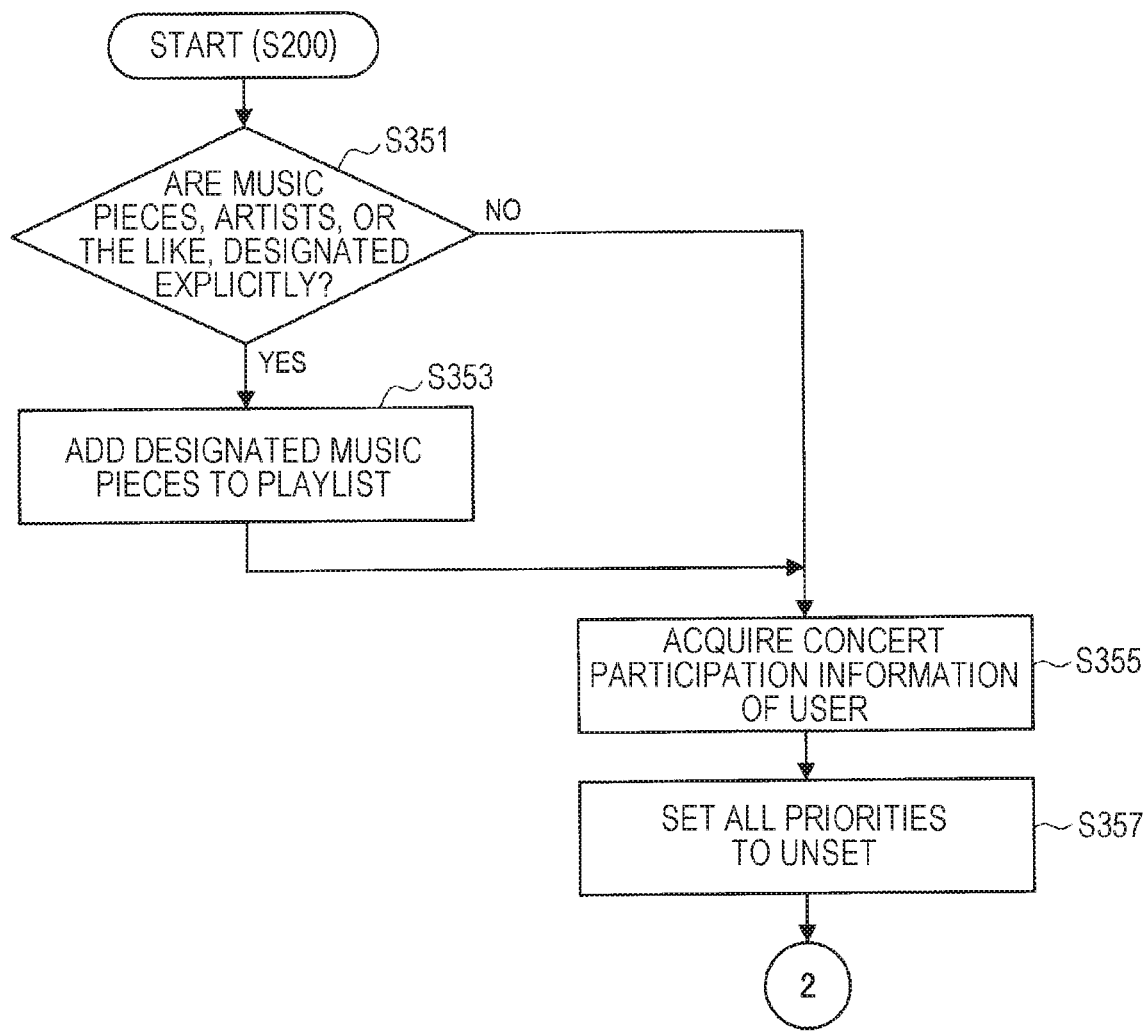
FIG. 15 is a flow chart of a stage of acquiring concert participation information according to a modification example of the first embodiment of the present disclosure.

Note that, in the present embodiment, the processing of "the stage of acquiring concert participation information" may be modified. For example, in a case where the user has explicitly designated music pieces, the following modification example may be applied when setting the order of music pieces that are to be played subsequently to the designated music pieces. Such a modification example will now be described with reference to FIG. 15. FIG. 15 is a flow chart of "the stage of acquiring concert participation information" according to a modification example of the present embodiment. As shown in FIG. 15, the present modification example may include a plurality of steps of step S351 to step S357. In the following, details of each of these steps are described. Note that, in the following description, only different points from the present embodiment shown in FIG. 14 described above are described, and a description of points shared by the present embodiment is omitted.

—Step S351—

In a similar manner to step S301 described above, the terminal device 300 assesses whether or not it has accepted, from the user, an explicit designation input that designates music pieces to be played, such as music pieces or artists. The terminal device 300 goes to step S353 in a case where it has accepted an explicit designation input like that described above, or goes to step S355 in a case where it has not accepted an explicit designation input.

—Step S353—

The terminal device 300 adds the designated music pieces to the playlist (illustration omitted) in conformity with the instruction accepted in step S301 described above, in a similar manner to step S303 described above, and goes to step S355.

—Step S355 to Step S357—

These steps are similar to step S305 to step S307 described above, and therefore a description is omitted herein.

(2.5.5 Stage of Performing Processing on Schedule of Concerts)

Figure 16:
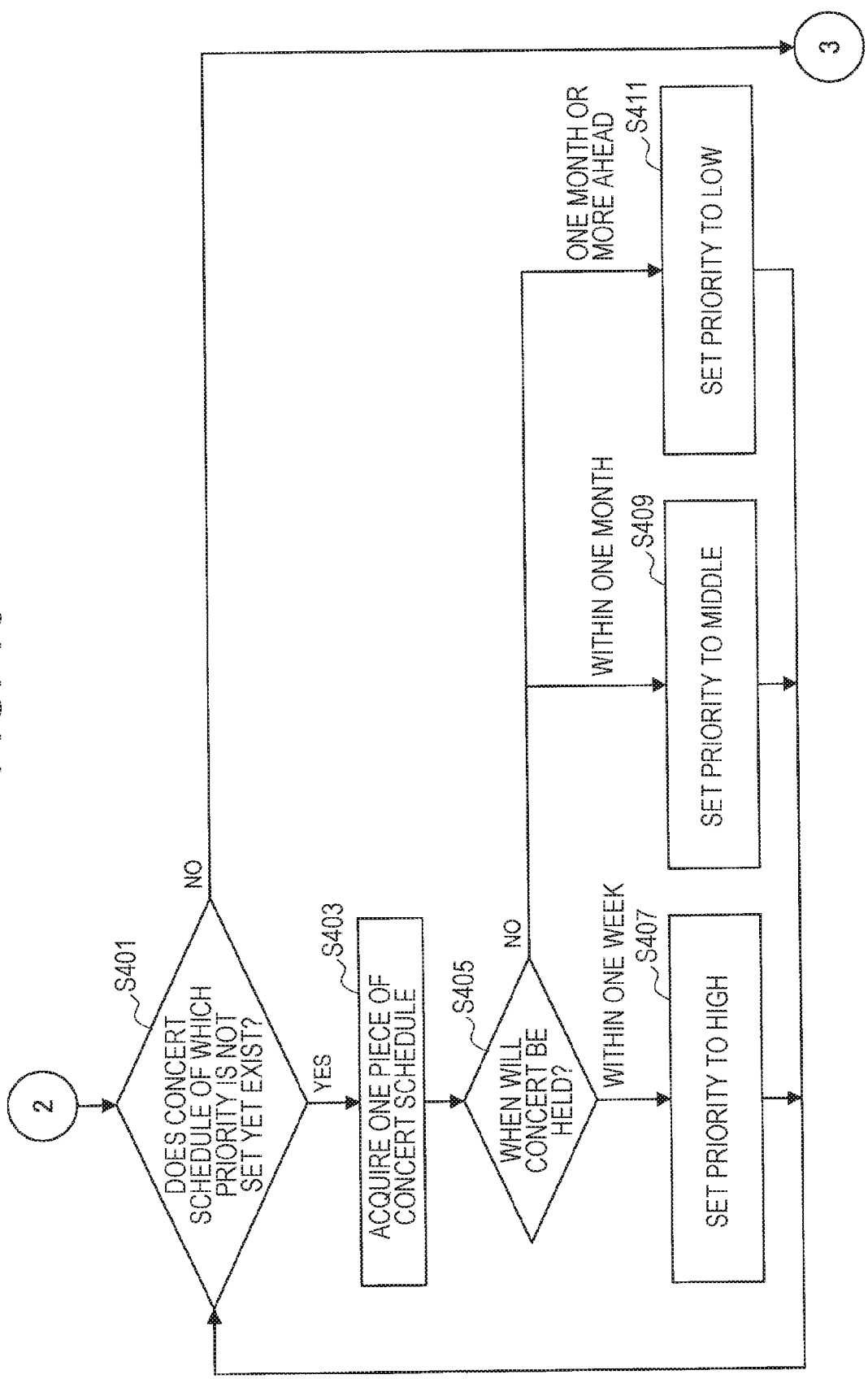
FIG. 16 is a flow chart of a stage of processing a concert schedule according to the first embodiment of the present disclosure.

Next, an information processing method in "the stage of processing a concert schedule (step S400)" of the information processing method according to the present embodiment is described with reference to FIG. 16 and FIG. 17. FIG. 16 is a flow chart of "the stage of processing a concert schedule" according to the present embodiment, and FIG. 17 is a diagram showing an example of the priority list 706 according to the present embodiment. As shown in FIG. 16, "the stage of processing a concert schedule" may include a plurality of steps of step S401 to step S411. In the following, details of each of these steps are described. Herein, as the processing of a concert schedule, the terminal device 300 sets priorities on a schedule of concerts that the user is to participate in in the future with the present time as a standard, on the basis of the days of holding of the concerts. Furthermore, the terminal device 300 implements the following processing repeatedly until a piece of the concert schedule of which the priority is unset disappears.

—Step S401—

The terminal device 300 assesses whether or not, with the present time as a standard, a piece of the concert schedule of which the priority is not set yet and that the user is to participate in in the future exists in the concert participation information 704. The terminal device 300 goes to step S403 in a case where a piece of the concert schedule of which the priority is not set exists, or goes to step S500 (the stage of processing a concert history) in a case where a piece of the concert schedule of which the priority is not set does not exist.

—Step S403—

The terminal device 300 acquires one piece of the concert schedule from pieces of the concert schedule of which the priorities are not set and that are included in the concert participation information 704.

—Step S405—

The terminal device 300 assesses when the piece of the concert schedule acquired in step S403 described above will be held with the present time as a standard, and goes to any of step S407 to step S411 described later in accordance with the result of assessment. In detail, the terminal device 300 goes to step S407 in a case where the day of holding of the acquired piece of the concert schedule is coming soon with the present time as a standard (for example, within one week). Further, the terminal device 300 goes to step S409 if the day of holding of the acquired piece of the concert schedule is in the near future (for example, one week or more from now within one month). Furthermore, the terminal device 300 goes to step S411 if the day of holding of the acquired piece of the concert schedule is in the future (for example, one month or more from now).

—Step S407—

The terminal device 300 sets the priority of the artist related to the acquired piece of the concert schedule to "high", and returns to step S401.

—Step S409—

The terminal device 300 sets the priority of the artist related to the acquired piece of the concert schedule to "middle", and returns to step S401.

—Step S411—

The terminal device 300 sets the priority of the artist related to the acquired piece of the concert schedule to "low", and returns to step S401.

The terminal device 300 implements each of the steps described above repeatedly until a piece of the concert schedule of which the priority is unset disappears, and generates a priority list 706 like that shown in FIG. 17. The priority list 706 includes, as shown in FIG. 17, information of priorities that are set in the above manner, along with information of the dates and times of holding of concerts that the user is to participate in in the future and artists who are to perform in the concerts. Although the description described above is given on the assumption that the priority is set as "high", "middle", or "low", the present embodiment is not limited to setting the priority in such three stages. For example, in the present embodiment, the priority may be set as a numerical value or may be set in two stages or more, and is not particularly limited. Furthermore, also the priority that is set in processing performed thereafter is similar.

As hereinabove, in "the stage of processing a concert schedule", processing for setting the priorities of artists is performed such that, if the day of holding of a concert is coming sooner, music pieces of the artist related to the concert are played more preferentially. In the present embodiment, by using the future action schedule of the user included in the concert participation information 704, the priorities of music pieces of the artist related to a concert can be set on the basis of the day of holding of the concert. As a result, in the present embodiment, if the day of holding of a concert to participate in is coming up, the user can be provided with music pieces of the artist mentioned above preferentially and automatically.

Figure 18:
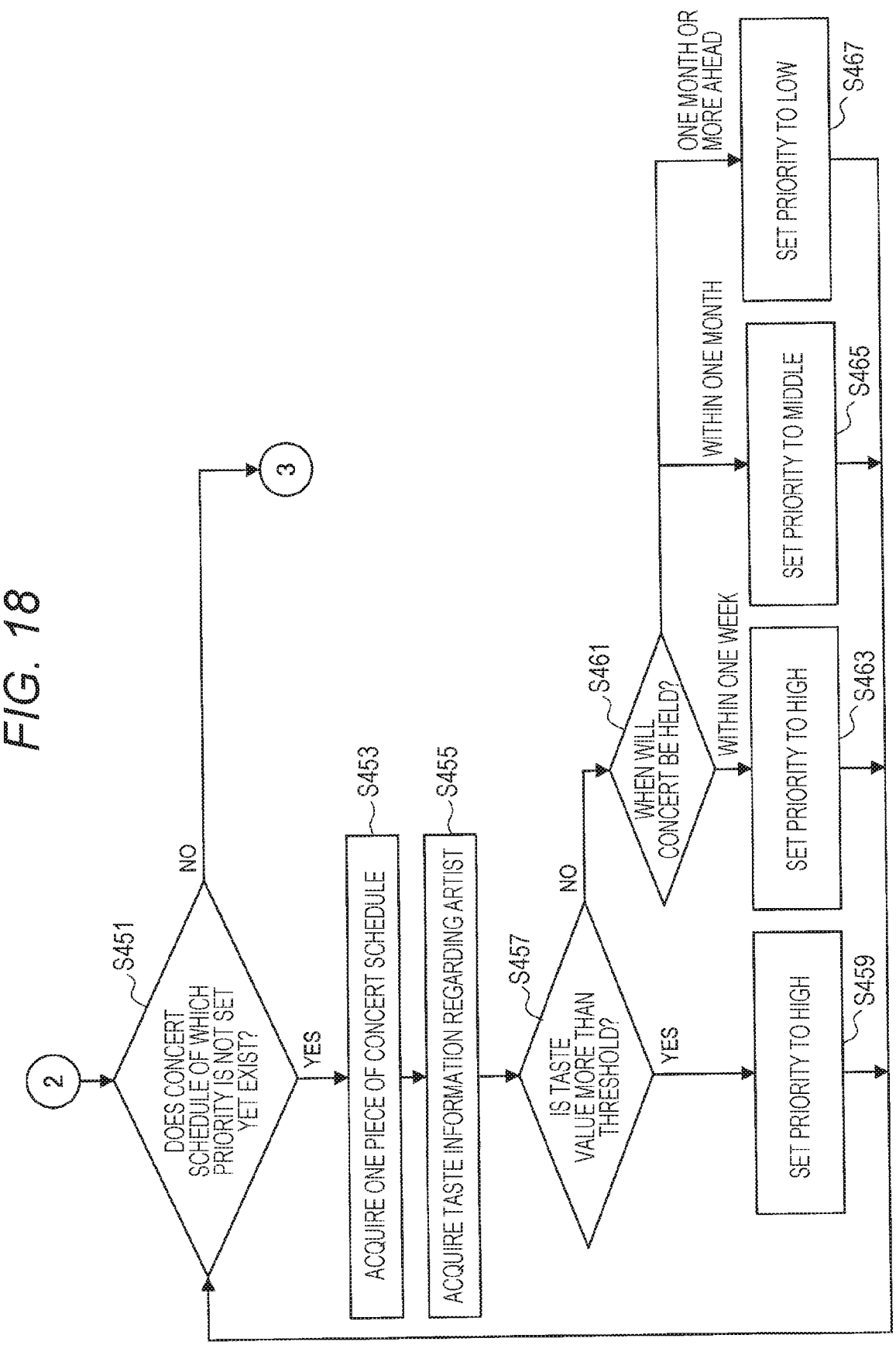
FIG. 18 is a flow chart of a stage of processing a concert schedule according to a modification example of the first embodiment of the present disclosure.

Note that, in the present embodiment, processing in "the stage of processing a concert schedule" may be modified. For example, in a case where taste information for an artist of the user is acquired and the artist is a favorite artist of the user (for example, the taste value is not less than a fixed value), the priority may be set high regardless of the time of holding of a concert of the artist. Note that the taste information of the user may be set by, for example, being digitized as a taste value by referring to a history of streaming or purchase of music pieces by the user, a history of participation in concerts, or the like. Such a modification example will now be described with reference to FIG. 18. FIG. 18 is a flow chart of "the stage of processing a concert schedule" according to a modification example of the present embodiment. As shown in FIG. 18, the present modification example may include a plurality of steps of step S451 to step S467. In the following, details of each of these steps are described. Note that, in the following description, only different points from the present embodiment shown in FIG. 16 described above are described, and a description of points shared by the present embodiment is omitted.

—Step S451—

In a similar manner to step S401 described above, the terminal device 300 assesses whether or not, with the present time as a standard, a piece of the concert schedule of which the priority is not set yet and that the user is to participate in in the future exists in the concert participation information 704. The terminal device 300 goes to step S453 in a case where a piece of the concert schedule of which the priority is not set exists, or goes to step S500 (the stage of processing a concert history) in a case where a piece of the concert schedule of which the priority is not set does not exist.

—Step S453—

In a similar manner to step S403 described above, the terminal device 300 acquires one piece of the concert schedule from pieces of the concert schedule of which the priorities are not set and that are included in the concert participation information 704.

—Step S455—

The terminal device 300 acquires taste information (a taste value) regarding the artist related to the piece of the concert schedule acquired in step S453 described above.

—Step S457—

The terminal device 300 assesses whether or not the taste value acquired in step S455 described above is not less than a prescribed threshold set in advances. The terminal device 300 goes to step S459 in a case where the acquired taste value is not less than the threshold, or goes to step S461 in a case where the acquired taste value is not less than the threshold.

—Step S459—

The terminal device 300 sets the priority of the artist related to the acquired piece of the concert schedule to "high", and returns to step S451.

—Step S461 to Step S467—

These steps are similar to step S405 to step S411 described above, and therefore a description is omitted herein.

(2.5.6 Stage of Performing Processing on History of Concerts)

Figure 19:
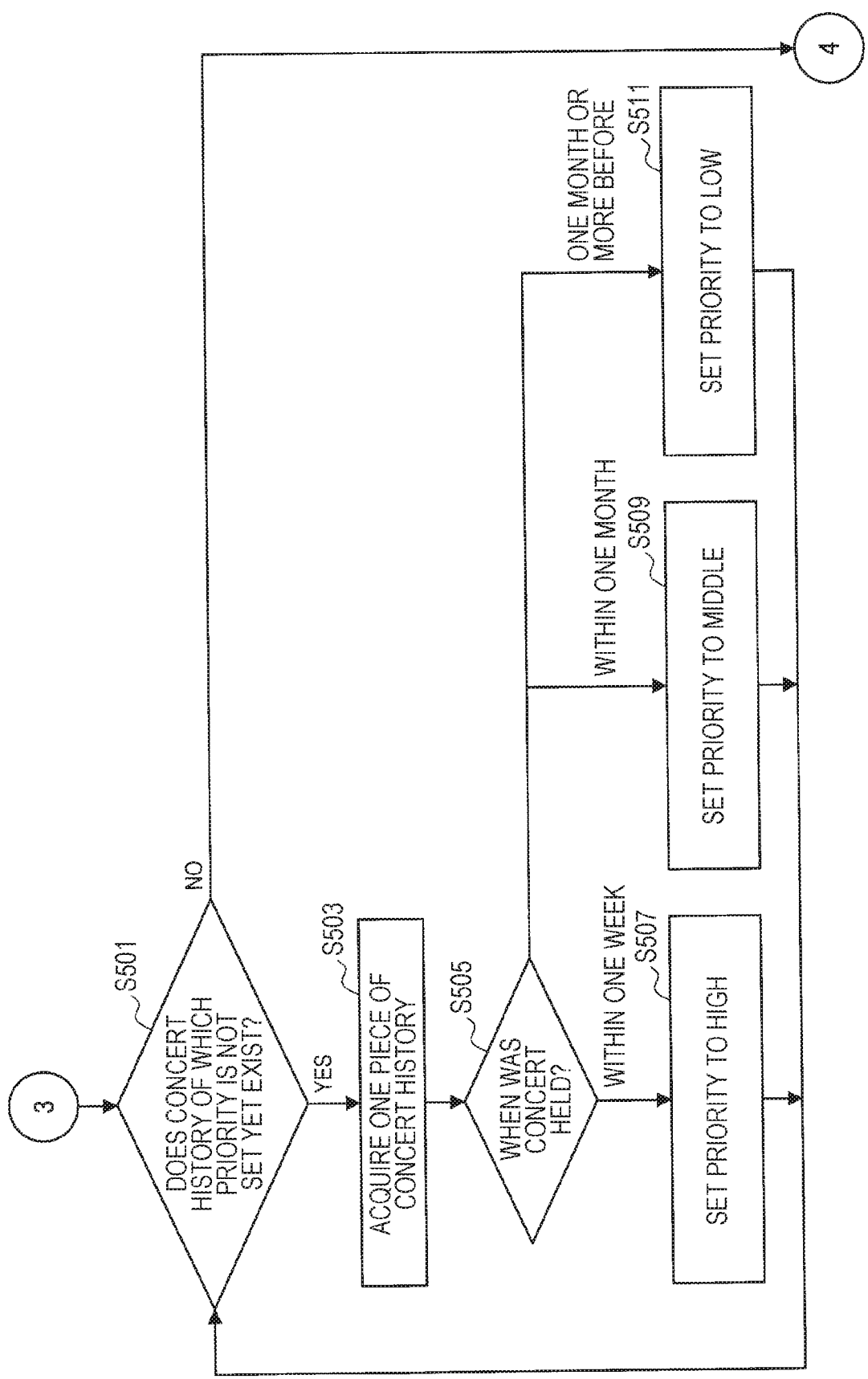
FIG. 19 is a flow chart of a stage of processing a concert history according to the first embodiment of the present disclosure.

Next, an information processing method in "the stage of processing a concert history (step S500)" of the information processing method according to the present embodiment is described with reference to FIG. 19. FIG. 19 is a flow chart of "the stage of processing a concert history" according to the present embodiment. As shown in FIG. 19, "the stage of processing a concert history" may include a plurality of steps of step S501 to step S511. In the following, details of each of these steps are described. Herein, as the processing of a concert history, the terminal device 300 sets priorities on a history of concerts that the user participated in the past with the present time as a standard, on the basis of the days of holding of the concerts. Furthermore, the terminal device 300 implements the following processing repeatedly until a piece of the concert history of which the priority is unset disappears.

—Step S501—

The terminal device 300 assesses whether or not, with the present time as a standard, a piece of the concert history of which the priority is not set yet and that the user participated in in the past exists in the concert participation information 704. The terminal device 300 goes to step S503 in a case where a piece of the concert history of which the priority is not set exists, or goes to step S600 (the stage of adding music pieces) in a case where a piece of the concert history of which the priority is not set does not exist.

—Step S503—

The terminal device 300 acquires one piece of the concert history from pieces of the concert history of which the priorities are not set and that are included in the concert participation information 704.

—Step S505—

The terminal device 300 assesses when the piece of the concert history acquired in step S503 described above was held with the present time as a standard, and goes to any of step S507 to step S511 described later in accordance with the result of assessment. In detail, the terminal device 300 goes to step S507 in a case where the day of holding of the acquired piece of the concert history was close with the present time as a standard (for example, within one week). Further, the terminal device 300 goes to step S509 if the day of holding of the acquired piece of the concert history was in the recent past (for example, one week or more from now within one month). Furthermore, the terminal device 300 goes to step S511 if the day of holding of the acquired piece of the concert history was in the past (for example, one month or more from now).

—Step S507 to Step S509—

These steps are similar to step S405 and step S409 illustrated in FIG. 16 described above, and therefore a description is omitted herein.

—Step S511—

The terminal device 300 sets the priority of the artist related to the acquired piece of the concert history to "low". Alternatively, in a case where a priority is already set, the terminal device 300 may not alter the priority of the artist related to the acquired piece of the concert history but maintain the priority as it is, or may set the priority not to "low" but to "already checked".

The terminal device 300 implements each of the steps described above repeatedly until a piece of the concert history of which the priority is unset disappears, and generates a priority list 706 like that shown in FIG. 17. The priority list 706 includes, as shown in FIG. 17, information of priorities that are set in the above manner, along with information of the dates and times of holding of concerts that the user participated in in the past and artists who performed in the concerts.

As hereinabove, in "the stage of processing a concert history" according to the present embodiment, processing for setting the priorities of artists is performed such that, if the day of holding of a concert was closer, music pieces of the artist related the concert are played more preferentially. In the present embodiment, by using the past action history of the user included in the concert participation information 704, the priorities of music pieces of the artist related to a concert can be set on the basis of the day of holding of the concert. As a result, in the present embodiment, if the day of holding of a concert participated in was closer, the user can be provided with music pieces of the artist mentioned above preferentially and automatically.

Figure 20:
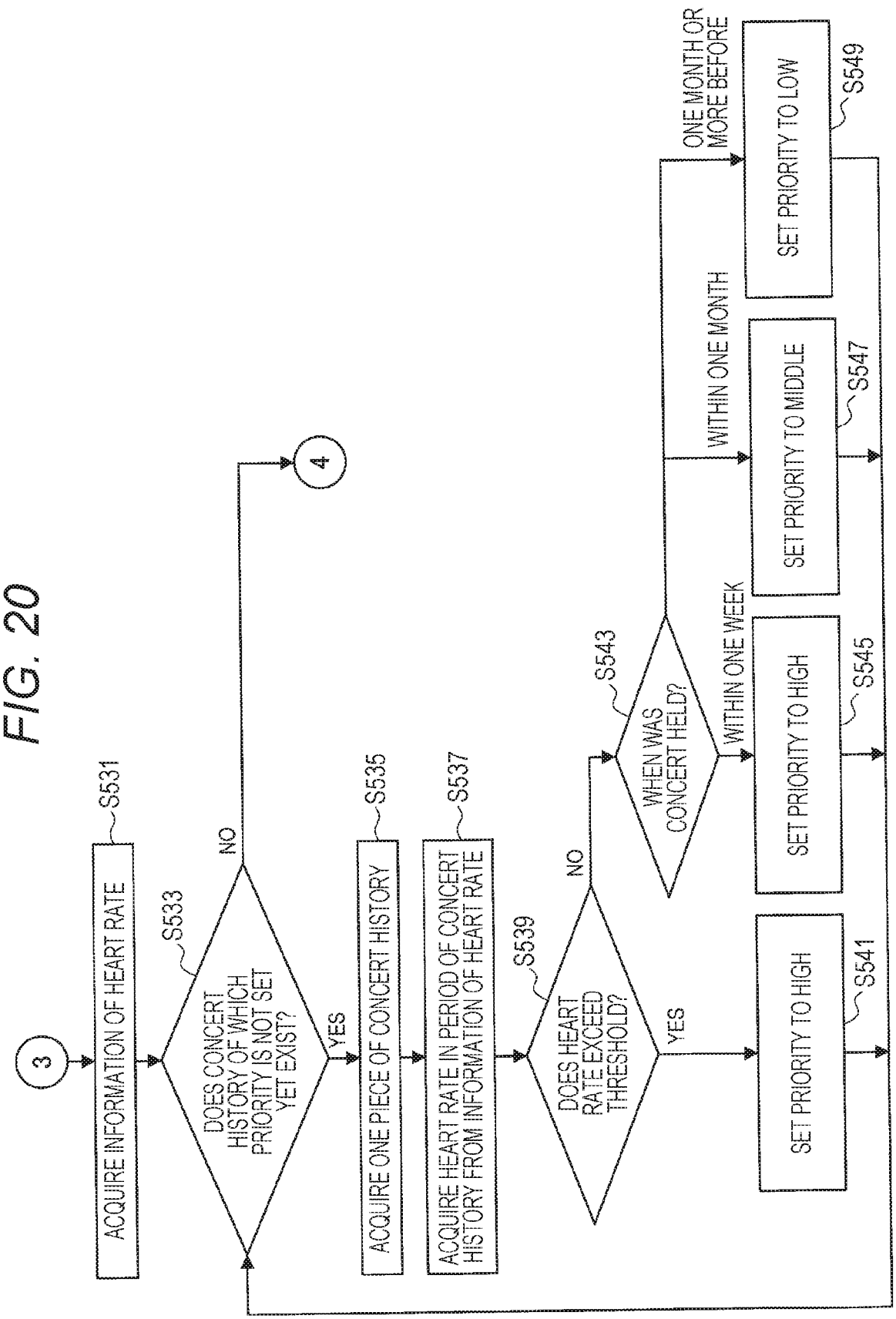
FIG. 20 is a flow chart of a stage of processing a concert history according to modification example 1 of the first embodiment of the present disclosure.

Note that, in the present embodiment, processing in "the stage of processing a concert history" may be modified. For example, in a case where the terminal device 300 acquires living body information of the user such as the heart rate or the like during a concert and assesses on the basis of the living body information that the user got excited or the like, the terminal device 300 may set the priority of the artist who performed in the concert to "high" regardless of the time of holding of the concert. Note that the living body information of the user can be acquired by various sensors of the sensing section 110 of the detection device 100. Such Modification example 1 will now be described with reference to FIG. 20. FIG. 20 is a flow chart of "the stage of processing a concert history" according to Modification example 1 of the present embodiment. As shown in FIG. 20, Modification example 1 may include a plurality of steps of step S531 to step S549. In the following, details of each of these steps are described. Note that, in the following description, only different points from the present embodiment shown in FIG. 19 described above are described, and a description of points shared by the present embodiment is omitted.

—Step S531—

The terminal device 300 acquires information of the heart rate of the user (for example, temporal change in the value of the heart rate per unit time) from the living body information sensor of the sensing section 110 of the detection device 100.

—Step S533—

In a similar manner to step S501 described above, the terminal device 300 assesses whether or not, with the present time as a standard, a piece of the concert history of which the priority is not set yet and that the user participated in in the past exists in the concert participation information 704. The terminal device 300 goes to step S535 in a case where a piece of the concert history of which the priority is not set exists, or goes to step S600 (the stage of adding music pieces) in a case where a piece of the concert history of which the priority is not set does not exist.

—Step S535—

In a similar manner to step S503 described above, the terminal device 300 acquires one piece of the concert history from pieces of the concert history of which the priorities are not set and that are included in the concert participation information 704.

—Step S537—

The terminal device 300 acquires the heart rate of the user in a period related to the piece of the concert history acquired in step S535 described above. For example, the terminal device 300 acquires temporal change in the heart rate per unit time in a period related to the piece of the concert history mentioned above, and calculates the average value (time average) of the heart rate per unit time in the period.

—Step S539—

The terminal device 300 assesses whether or not the heart rate (time average) acquired in step S537 described above is not less than a prescribed threshold set in advances. The terminal device 300 goes to step S541 in a case where the heart rate mentioned above is not less than the threshold, or goes to step S543 in a case where the heart rate mentioned above is not less than the threshold.

—Step S541—

The terminal device 300 sets the priority of the artist related to the acquired piece of the concert history to "high", and returns to step S533. That is, in the present modification example, for example, in a case where the heart rate is not less than the threshold mentioned above, it is assessed that the user got excited in the concert related to the heart rate, and the priority of the artist related to the concert is set to "high".

—Step S543 to Step S549—

These steps are similar to step S505 to step S511 described above, and therefore a description is omitted herein.

Note that, although the description described above uses information of the heart rate as living body information, the present modification example is not limited to this. For example, the living body information used may be the pulse rate, the blood pressure, the brain waves, the respiration, the perspiration, the myoelectric potential, the temperature of the skin, the electric resistance of the skin, the eyeball movement, the size of the pupil diameter, the steady gaze time, the facial expression, or the like that can be detected by the living body information sensor mentioned above. Further, in the present modification example, a motion of the user that can be detected by the motion sensor mentioned above (the user's clapping, stepping, or the like during a concert), a voice of the user that can be detected by the sound sensor mentioned above (the user's shout of joy or the like during a concert), or the like may be used instead of living body information.

Figure 21:
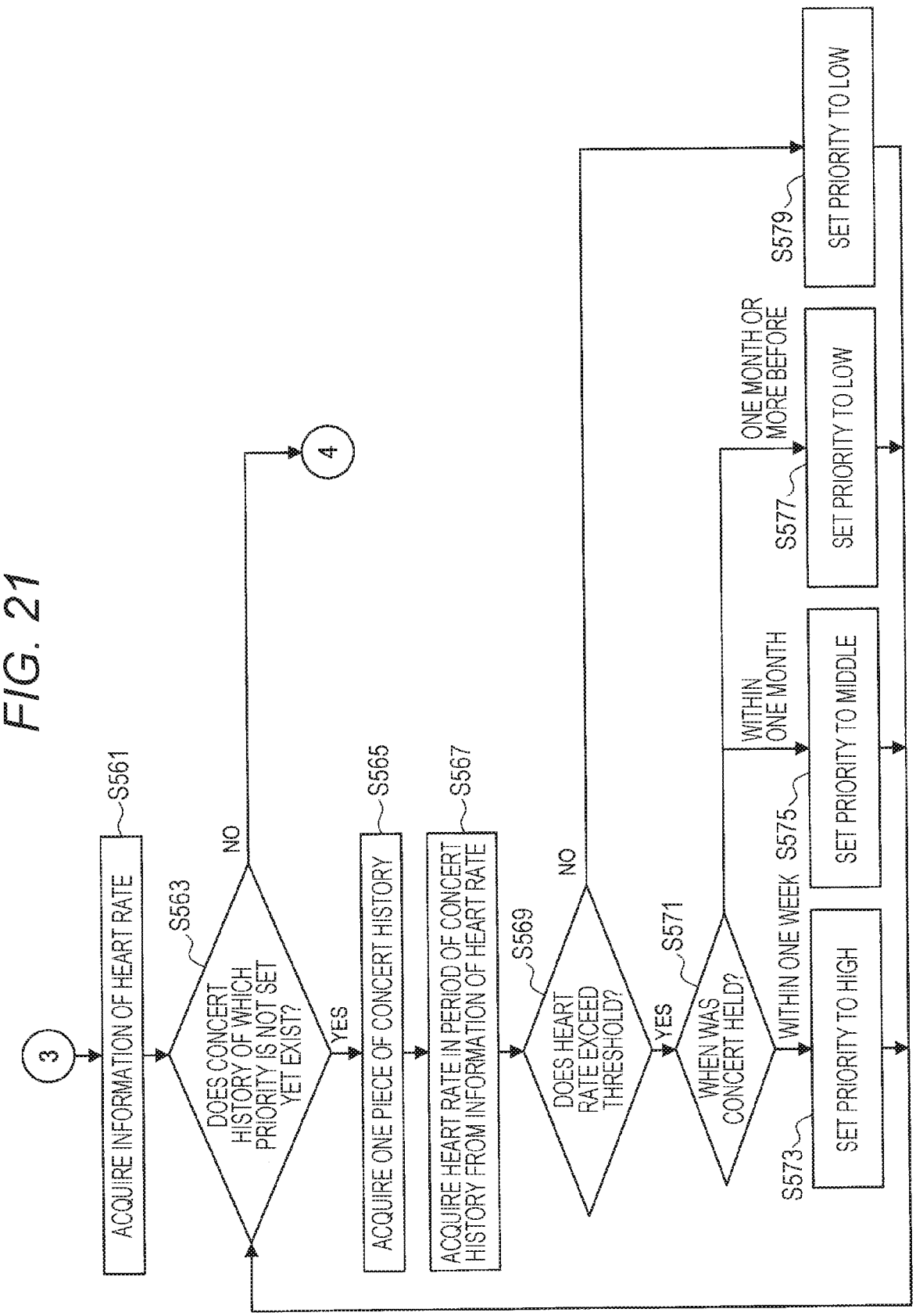
FIG. 21 is a flow chart of a stage of processing a concert history according to modification example 2 of the first embodiment of the present disclosure.

Further, processing in Modification example 1 above may be further modified. For example, in a case where the terminal device 300 acquires living body information of the user such as the heart rate or the like during a concert and assesses on the basis of the living body information that the user didn't get excited or the like, the terminal device 300 may set the priority of the artist to "low" regardless of the time of holding of the concert. Such Modification example 2 will now be described with reference to FIG. 21. FIG. 21 is a flow chart of "the stage of processing a concert history" according to Modification example 2 of the present embodiment. As shown in FIG. 21, Modification example 2 may include a plurality of steps of step S561 to step S579. In the following, details of each of these steps are described. Note that, in the following description, only different points from Modification example 1 shown in FIG. 20 described above are described, and a description of points shared by Modification example 1 is omitted.

—Step S561 to Step S567—

These steps are similar to step S531 to step S537 described above, and therefore a description is omitted herein.

—Step S569—

In a similar manner to step S539 of Modification example 1, the terminal device 300 assesses whether or not the heart rate (time average) acquired in step S567 described above is not less than a prescribed threshold set in advance. The terminal device 300 goes to step S571 in a case where the heart rate mentioned above is not less than the threshold, or goes to step S579 in a case where the heart rate mentioned above is not less than the threshold.

—Step S571 to Step S577—

These steps are similar to step S543 to step S549 described above, and therefore a description is omitted herein.

—Step S579—

This step is similar to step S549 described above, and therefore a description is omitted herein.

(2.5.7 Stage of Adding Music Pieces)

Figure 22:
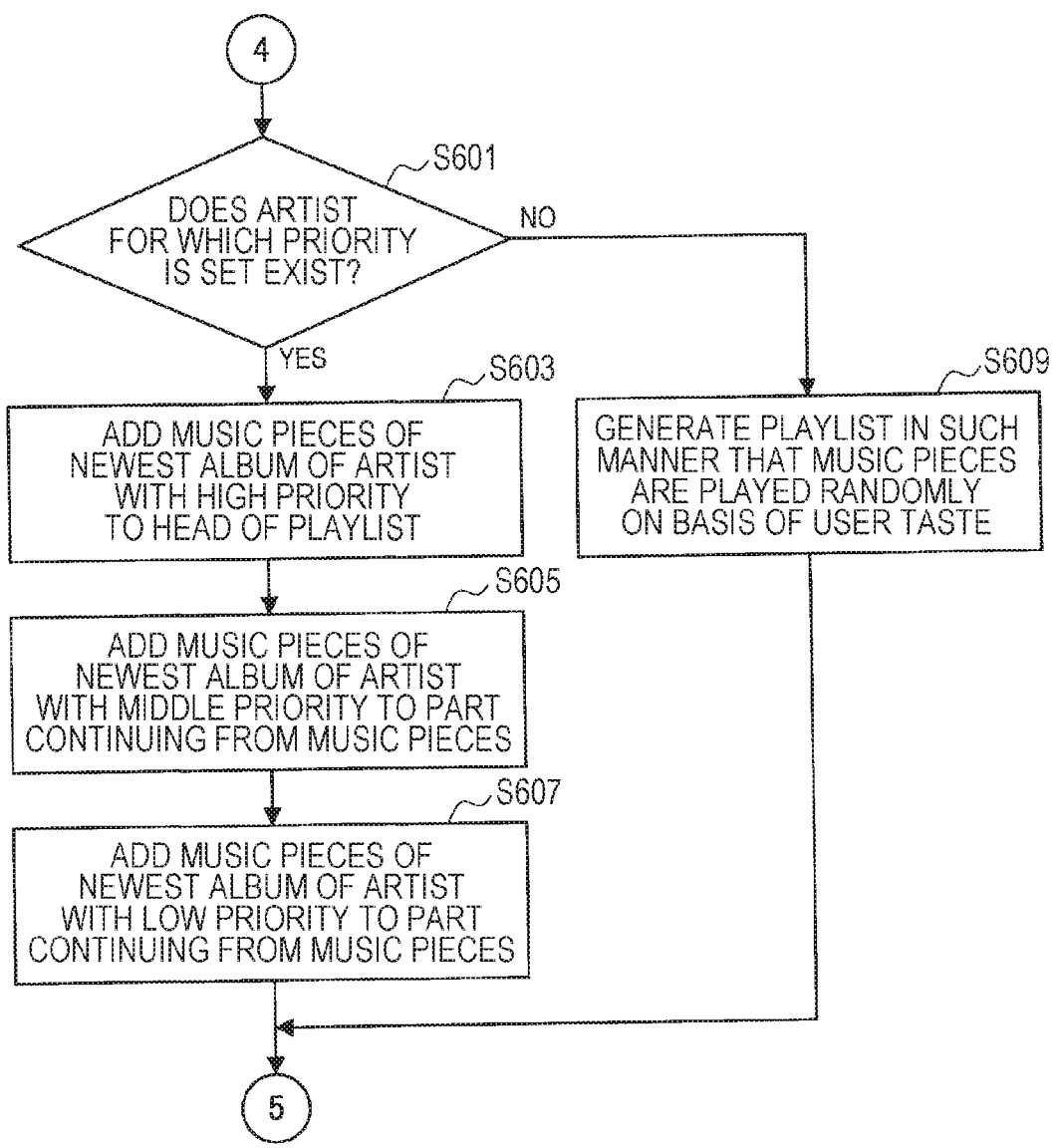
FIG. 22 is a flow chart of a stage of adding music pieces according to the first embodiment of the present disclosure.

Next, an information processing method in "the stage of adding music pieces (step S600)" of the information processing method according to the present embodiment is described with reference to FIG. 22. FIG. 22 is a flow chart of "the stage of adding music pieces" according to the present embodiment. As shown in FIG. 22, the processing of "the stage of adding music pieces" may include a plurality of steps of step S601 to step S609. In the following, details of each of these steps are described. Herein, the terminal device 300 implements processing in which, in conformity with the priorities that are set in the processing of step S500 described above, pieces of music of the newest album of an artist with a high priority are added to the head of the playlist and subsequently music pieces of an artist with a middle priority and an artist with a low priority are added successively to the playlist (illustration omitted).

—Step S601—

The terminal device 300 assesses whether or not an artist for which a priority of any of high, middle, and low is set in "the stage of processing a concert schedule (step S400)" and "the stage of processing a concert history (step S500)" described above exists in the priority list 706. The terminal device 300 goes to step S603 in a case where an artist of which the priority is set exists, or goes to step S609 in a case where an artist of which the priority is set does not exist.

—Step S603—

The terminal device 300 adds music pieces of the newest album of an artist with a priority of "high" of the priority list 706 to the head of the playlist (illustration omitted).

—Step S605—

The terminal device 300 adds music pieces of the newest album of an artist with a priority of "middle" of the priority list 706 to the part continuing from the music pieces added in step S603 described above.

—Step S607—

The terminal device 300 adds music pieces of the newest album of an artist with a priority of "low" of the priority list 706 to the part continuing from the music pieces added in step S605 described above, and goes to step S700 (the stage of playing music pieces).

—Step S609—

The terminal device 300 generates a playlist (illustration omitted) in such a manner that music pieces are played randomly on the basis of taste information of the user, and goes to step S700 (the stage of playing music pieces).

Note that, although the description described above is given on the assumption that the music pieces added to the playlist are music pieces of the newest album of the artist in question, the present embodiment is not limited to this. For example, in the present embodiment, music pieces that are highly likely to be performed in a concert, music pieces with large numbers of times of playing, representative pieces of music, music pieces of a best album, or the like of the artist in question may be added. Further, in the present embodiment, in a case where a setlist of music pieces that were performed in a concert is included in the acquired concert information DB 702, the music pieces existing in the setlist may be added.

Figure 23:
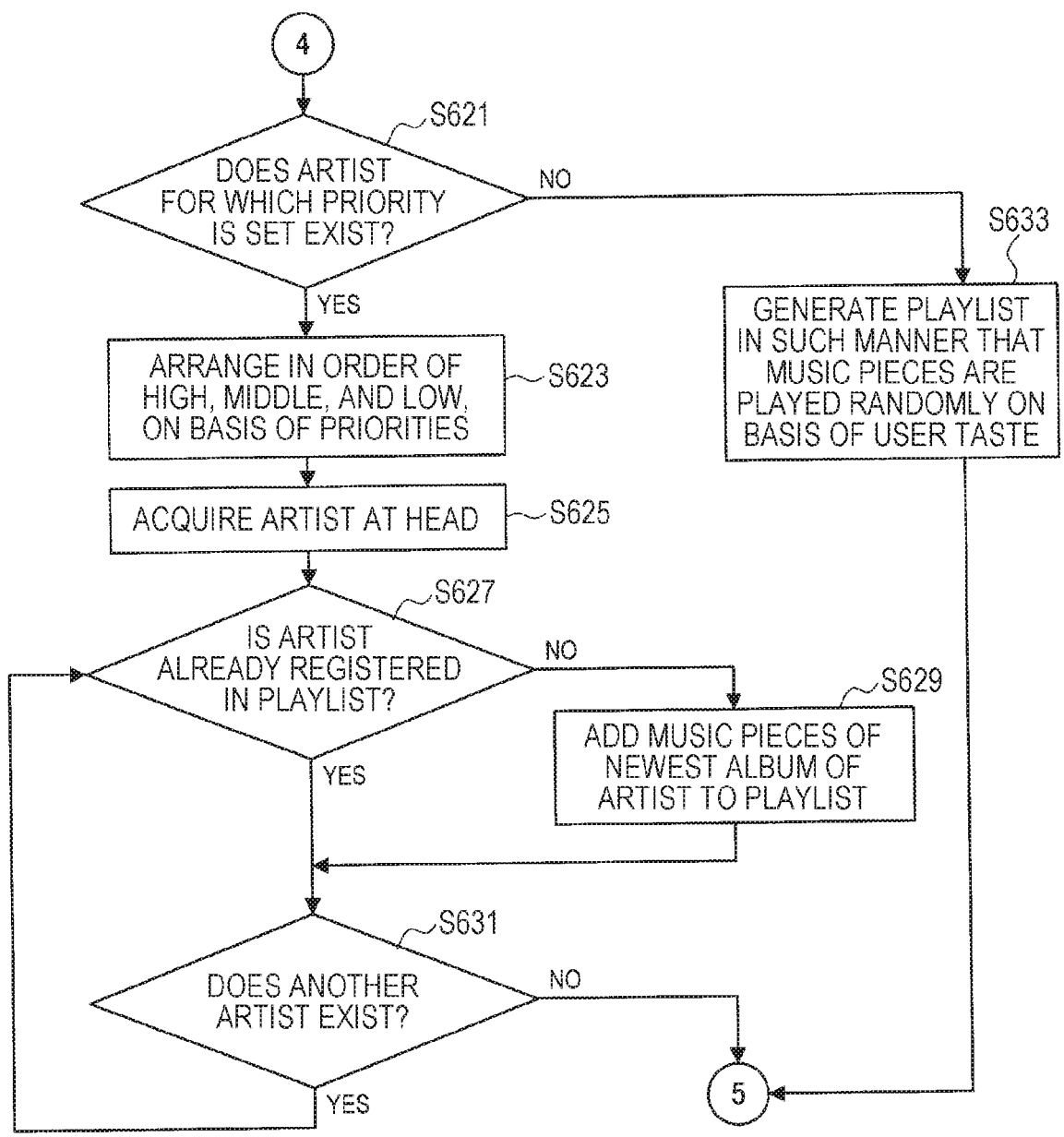
FIG. 23 is a flow chart of a stage of adding music pieces according to modification example 1 of the first embodiment of the present disclosure.

Note that, in the present embodiment, processing in "the stage of adding music pieces" may be modified. For example, the terminal device 300 may perform processing in such a manner that an artist registered in the playlist (illustration omitted) is not duplicated. Such Modification example 1 will now be described with reference to FIG. 23. FIG. 23 is a flow chart of "the stage of adding music pieces" according to Modification example 1 of the present embodiment. As shown in FIG. 23, the Modification example 1 may include a plurality of steps of step S621 to step S633. In the following, details of each of these steps are described. Note that, in the following description, only different points from the present embodiment shown in FIG. 22 described above are described, and a description of points shared by the present embodiment is omitted.

—Step S621—

In a similar manner to step S601 described above, the terminal device 300 assesses whether or not an artist for which a priority of any of high, middle, and low is set in "the stage of processing a concert schedule" and "the stage of processing a concert history" described above exists in the priority list 706. The terminal device 300 goes to step S623 in a case where an artist of which the priority is set exists, or goes to step S633 in a case where an artist of which the priority is set does not exist.

—Step S623—

The terminal device 300 rearranges (sorts) the artists so that the priorities are arranged in the order of high, middle, and low, on the basis of the priorities of the priority list 706.

—Step S625—

The terminal device 300 acquires the artist at the head of the priority list 706 rearranged in step S623 described above.

—Step S627—The terminal device 300 assesses whether or not the artist acquired in step S625 described above is an artist already registered in the playlist (illustration omitted). The terminal device 300 goes to step S631 if the artist mentioned above is already registered in the playlist, or goes to step S629 in a case where the artist mentioned above is not registered.

—Step S629—

The terminal device 300 adds music pieces of the newest album of the artist acquired in step S625 described above to the head of the playlist (illustration omitted).

—Step S631—

The terminal device 300 assesses whether or not another artist exists after the artist acquired in step S625 in the priority list 706 rearranged in step S623 described above. The terminal device 300 returns to step S627 in a case where the next artist exists, or goes to step S700 (the stage of playing music pieces) in a case where the next artist does not exist.

—Step S633—

This step is similar to step S609 described above, and therefore a description is omitted herein.

Figure 24:
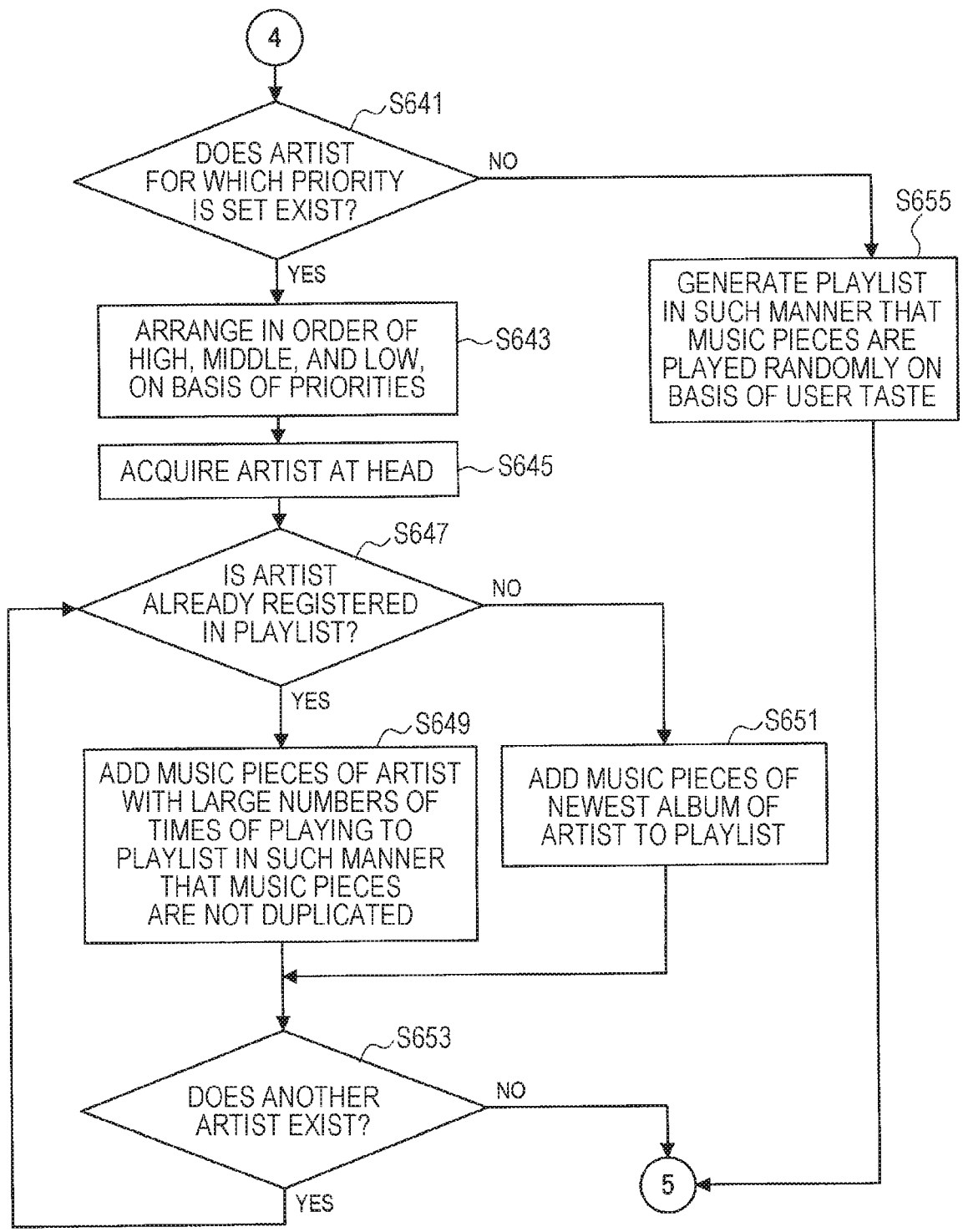
FIG. 24 is a flow chart of a stage of adding music pieces according to modification example 2 of the first embodiment of the present disclosure.

Further, processing in Modification example 1 above may be further modified. For example, in a case of an artist that has been acquired duplicately, the terminal device 300 may add, to the playlist (illustration omitted), popular music pieces that are frequently performed in concerts or events as standard pieces of music, or music pieces with large numbers of times of playing, instead of music pieces of the newest album. Such Modification example 2 will now be described with reference to FIG. 24. FIG. 24 is a flow chart of "the stage of adding music pieces" according to Modification example 2 of the present embodiment. As shown in FIG. 24, the present Modification example 2 may include a plurality of steps of step S641 to step S655. In the following, details of each of these steps are described. Note that, in the following description, only different points from Modification example 1 shown in FIG. 23 described above are described, and a description of points shared by Modification example 1 is omitted.

—Step S641 to Step S647—

These steps are similar to step S621 to step S627 described above, and therefore a description is omitted herein.

—Step S649—

The terminal device 300 adds standard pieces of music of the artist acquired in step S645 to the playlist (illustration omitted) in such a manner that music pieces are not duplicated. Note that it is assumed that the standard pieces of music of the artist are regarded as music pieces with large numbers of times of playing or streaming and are set in advance on the basis of the numbers of times, for example.

—Step S651 to Step S655—

These steps are similar to step S629 to step S633 described above, and therefore a description is omitted herein.

Figure 25:
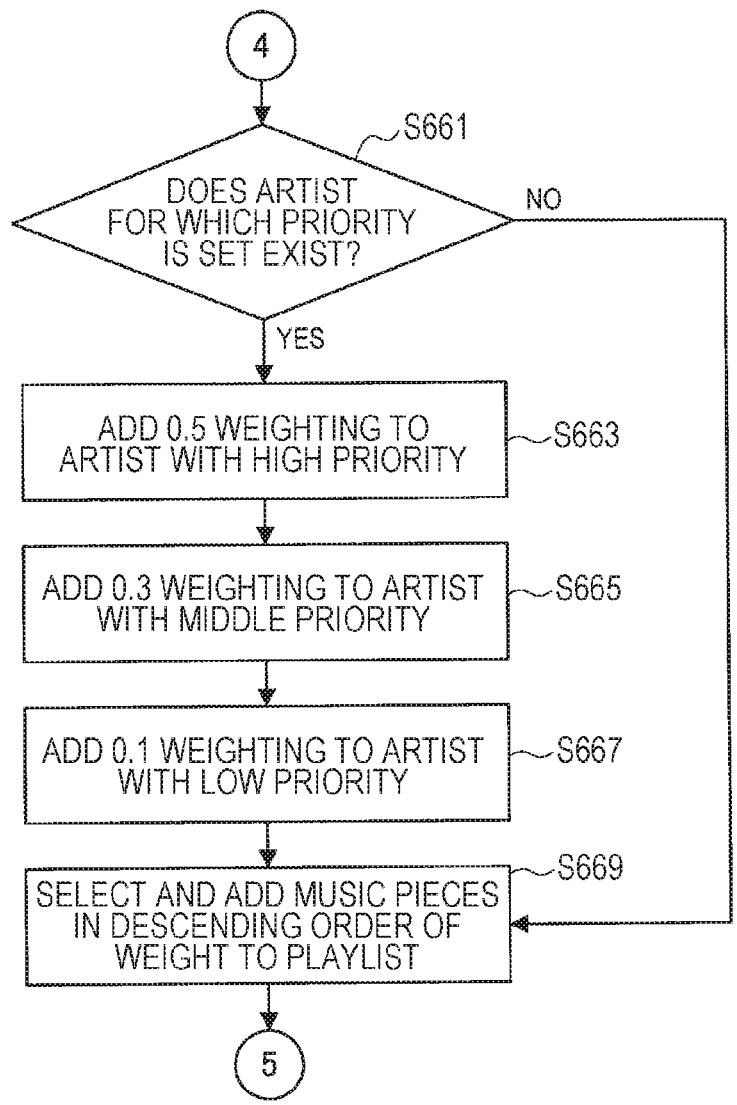
FIG. 25 is a flow chart of a stage of adding music pieces according to modification example 3 of the first embodiment of the present disclosure.

Further, in the present embodiment, processing in "the stage of adding music pieces" may be modified to a form other than those described above. For example, in a case where music pieces or artists are not specified, the terminal device 300 may use an existing music selection algorithm for selecting music pieces to be played. More specifically, in the music selection algorithm, weighting is performed on each artist on the basis of the priority that is set in "the stage of processing a concert schedule (step S400)" and "the stage of processing a concert history (step S500)" described above. Then, in the music selection algorithm, music pieces are added in descending order of the weight of the artist, and a playlist (illustration omitted) is generated. Such Modification example 3 will now be described with reference to FIG. 25. FIG. 25 is a flow chart of "the stage of adding music pieces" according to Modification example 3 of the present embodiment. As shown in FIG. 25, the present Modification example 3 may include a plurality of steps of step S661 to step S669. In the following, details of each of these steps are described. Note that, in the following description, only different points from the present embodiment shown in FIG. 22 described above are described, and a description of points shared by the present embodiment is omitted.

Note that, in the present modification example, it is assumed that, before implementing the following processing, the terminal device 300 acquires weighting information in which weights are set for a plurality of artists, on the basis of information of the numbers of times of streaming by the user or the like, for example. Then, in the present modification example 3, the weighting information is further adjusted on the basis of the priorities that are set in "the stage of processing a concert schedule" and "the stage of processing a concert history" described above. Alternatively, before implementing the following processing, the terminal device 300 may initialize the weighting information mentioned above, and may set the weight of each artist on the basis of the priority that is set in "the stage of processing a concert schedule" and "the stage of processing a concert history" described above.

—Step S661—

In a similar manner to step S601 described above, the terminal device 300 assesses whether or not an artist for which a priority of any of high, middle, and low is set in "the stage of processing a concert schedule" and "the stage of processing a concert history" described above exists in the priority list 706. The terminal device 300 goes to step S663 in a case where an artist of which the priority is set exists, or goes to step S669 in a case where an artist of which the priority is set does not exist.

—Step S663—

The terminal device 300 performs weighting so as to add a prescribed amount (for example, 0.5) to an artist with a priority of "high".

—Step S665—

The terminal device 300 performs weighting so as to add a prescribed amount (for example, 0.3) to an artist with a priority of "middle". Note that it is assumed that the amount added in the step S665 is smaller than the amount added in step S663 described above.

—Step S667—

The terminal device 300 performs weighting so as to add a prescribed amount (for example, 0.1) to an artist with a priority of "low". Note that it is assumed that the amount added in the step S667 is smaller than the amount added in step S665 described above.

—Step S669—

The terminal device 300 selects music pieces in such a manner that music pieces of artists are arranged in descending order of weight and generates a playlist (illustration omitted), and goes to step S700 (the stage of playing music pieces).

Furthermore, in the present embodiment, a playlist (illustration omitted) may be generated in agreement with the state of the user. For example, the state of the user is acquired by various sensors of the sensing section 110 of the detection device 100, and the genre of music pieces to be played may be selected in agreement with the acquired state of the user, for example. More specifically, in a case where, on the basis of sensing data of the motion sensor, the terminal device 300 has assessed that the user is running, the genre of music pieces to be included in the playlist may be selected such that music pieces with a good tempo are played for the running. Further, in the present embodiment, the terminal device 300 may specify the state of the user on the basis of schedule information of the user. For example, in a case where, on the basis of schedule information that was inputted to the terminal device 300 by the user in advance, the terminal device 300 has assessed that the user is 30 minutes before bedtime, the genre of music pieces to be included in the playlist may be selected such that music pieces that urge relaxation are played.

(2.5.8 Stage of Playing Music Pieces)

Figure 26:
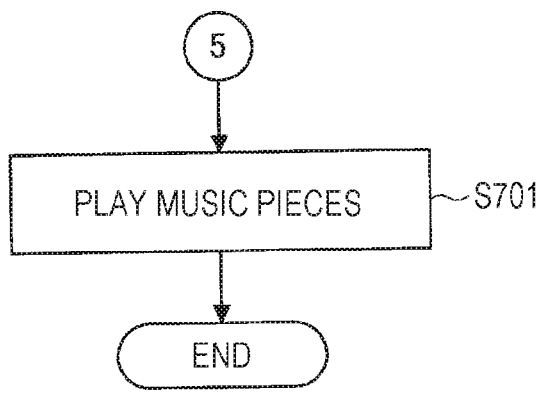
FIG. 26 is a flow chart of a stage of playing music pieces according to the first embodiment of the present disclosure.

Then, an information processing method in "the stage of playing music pieces (step S700)" of the information processing method according to the present embodiment is described with reference to FIG. 26. FIG. 26 is a flow chart of "the stage of playing music pieces" according to the present embodiment. In the processing described below, the terminal device 300 plays music pieces in conformity with the playlist (illustration omitted) generated in "the stage of adding music pieces (S600)". In detail, as shown in FIG. 26, "the stage of playing music pieces" includes step S701. In the following, details of the step S701 are described.

—Step S701—

The terminal device 300 plays music pieces successively in conformity with the playlist (illustration omitted) generated in "the stage of adding music pieces (S600)".

Note that, when playing music pieces, the terminal device 300 may play music pieces after performing effect processing of reproducing sound effects and shouts of joy of the concert venue. Further, when playing music pieces, the terminal device 300 may output information relating to music pieces (for example, information of the composer who composed the music pieces, moving images of a dance relating to the music pieces, etc.) to a display device that is the output section 370 of the terminal device 300.

As hereinabove, the present embodiment can provide music pieces suitable for the user by referring to not only a past action history of the user but also a future action schedule of the user. For example, even in a case where the user is planning to participate in a concert of an artist whom the user has not appreciated music pieces of in the past, the present embodiment can, if the day of holding of the concert to participate in is coming up, provide the user with music pieces of the artist mentioned above preferentially and automatically. As a result, by the present embodiment, the user can appreciate a lot of music pieces of the artist mentioned above before the concert, and can thus enjoy the concert mentioned above more.

Note that, although the description described above is given on the assumption that the priority of an artist is set, the present embodiment is not limited to this; a priority may be set for a music piece that was performed or is to be performed in a concert. Further, in the present embodiment, a priority may be set for the genre of music pieces, or a priority may be set for the creator of music pieces that were performed or are to be performed in a concert.

Further, in the description described above, the priority is set such that the priority is higher for an artist of a concert that the user is to participate in in the future or the user participated in in the past and that has the nearest date and time (year, month, and day) with respect to the present time, and music pieces of the artist are kept ready to be played preferentially. However, the present embodiment is not limited to this; for example, the priority may be set such that the priority is higher for an artist of a concert that the user is to participate in in the future or participated in in the past and that has a month and a day corresponding to the user's birthday or anniversary (for example, wedding anniversary) or has the nearest month and day with respect to the prescribed month and day. More specifically, if the user's birthday is Mar. 26, 1993, the priority may be set such that the priority is higher for an artist of a concert that was held on March 26 (for example, the year of holding is not questioned) or a concert that was held on a month and a day near March 26. Thereby, memories and music piece of a concert that the user participated in or is to participate in are remembered by the user while being tied to various memories regarding the birthday; thus, the concert that the user participated in in the past or the concert that the user is to participate in in the future can be made a more special event to the user.

3. Second Embodiment

In the first embodiment of the present disclosure described above, when generating a priority list 706, information of the heart rate of the user is acquired, and the priority is set on the basis of the acquired information of the heart rate (see FIG. 20); however, the present embodiment is not limited to this. For example, the terminal device 300 may acquire information of the heart rate of the user, generate taste information of the user on the basis of the acquired information of the heart rate, and set the priority by using the taste information. In the following, a second embodiment of the present disclosure in which such processing is performed is described.

Note that detailed configurations of the information processing system 10 according to the present embodiment and the devices included in the information processing system 10 are shared by the first embodiment described above. Therefore, herein, a detailed description of the configurations of the information processing system 10 according to the present embodiment and the devices included in the information processing system 10 is omitted.

<<3.1 Information Processing Method>>

Next, an information processing method in the present embodiment is described; a rough flow of the information processing method in the present embodiment is similar to the flow chart of the information processing method according to the first embodiment of the present disclosure shown in FIG. 5. However, the present embodiment differs from the first embodiment in that "a stage of generating taste information (S800)" described below is implemented after "the stage of generating concert participation information (step S100)" in the first embodiment. Furthermore, in the present embodiment, the processing of "the stage of processing a concert history (step S500)" differs from that of the first embodiment. Therefore, in the following description, only different points from the first embodiment described above are described, and a description of points shared by the first embodiment is omitted.

(3.1.2 Stage of Generating Taste Information)

Figure 27:
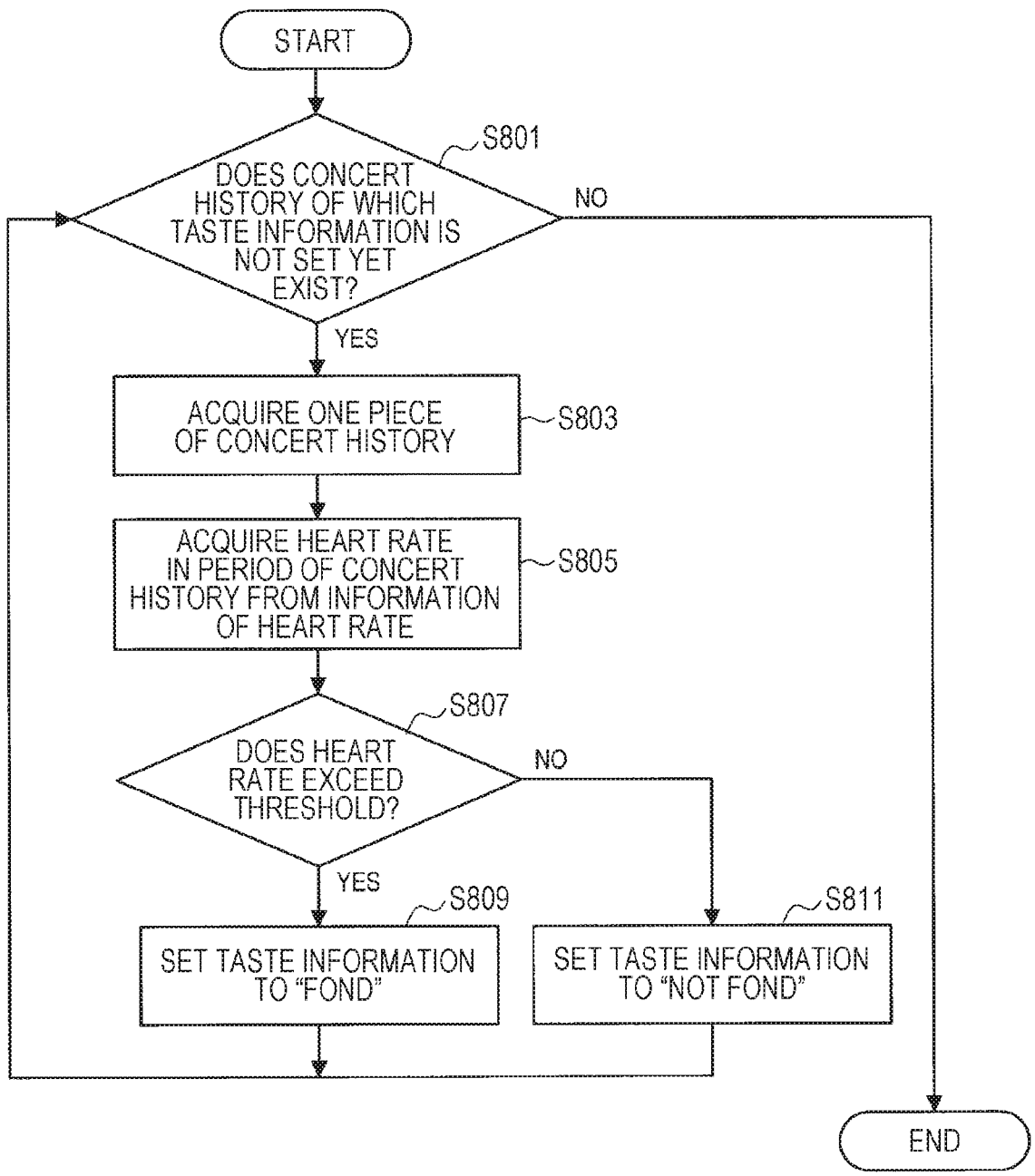
FIG. 27 is a flow chart of a stage of generating taste information of an information processing method according to a second embodiment of the present disclosure.

First, the present embodiment differs from the first embodiment described above in that "a stage of generating taste information (step S800)" is implemented; thus, "the stage of generating taste information" according to the present embodiment is described with reference to FIG. 27 and FIG. 28. FIG. 27 is a flow chart of the stage of generating taste information of the information processing method according to the present embodiment, and FIG. 28 is a diagram showing an example of concert participation information 704a according to the present embodiment. As shown in FIG. 27, "the stage of generating taste information" of the present embodiment may include a plurality of steps of step S801 to step S811. In the following, details of each of these steps are described. Herein, the terminal device 300 acquires information of the heart rate of the user, and implements processing of generating taste information of the user on the basis of the heart rate.

Note that it is assumed that "the stage of generating taste information" of the present embodiment is, for example, executed once or several times a day, periodically at times set in advance, similarly to "the stage of generating concert participation information" of the first embodiment.

—Step S801—

The terminal device 300 assesses whether or not, with the present time as a standard, a piece of the concert history of which the taste information is not set yet and that the user participated in in the past exists in the concert participation information 704 generated in step S100 described above. The terminal device 300 goes to step S803 in a case where a piece of the concert history of which the taste information is not set exists, or ends the processing in a case where a piece of the concert history of which the taste information is not set does not exist.

—Step S803—

The terminal device 300 acquires one piece of the concert history from pieces of the concert history of which the taste information is not set and that are included in the concert participation information 704.

—Step S805—

The terminal device 300 acquires the heart rate of the user in a period related to the piece of the concert history acquired in step S803 described above, from the sensing section 110 of the detection device 100. For example, the terminal device 300 acquires temporal change in the heart rate per unit time in a period related to the piece of the concert history mentioned above, and calculates the average value (time average) of the heart rate per unit time in the period.

—Step S807—

The terminal device 300 assesses whether or not the heart rate (time average) acquired in step S805 described above is not less than a prescribed threshold set in advance. The terminal device 300 goes to step S809 in a case where the heart rate mentioned above is not less than the threshold, or goes to step S811 in a case where the heart rate mentioned above is not less than the threshold.

—Step S809—

The terminal device 300 sets the information of taste for the artist related to the acquired piece of the concert history to "fond", and returns to step S801. That is, in the present embodiment, in a case where the heart rate was not less than a threshold in a concert, it is assessed that the user is fond of the artist related to the concert.

—Step S811—

The terminal device 300 sets the information of taste for the artist related to the acquired piece of the concert history to "not fond", and returns to step S801. That is, in the present embodiment, in a case where the heart rate was not more than a threshold in a concert, it is assessed that the user is not fond of the artist related to the concert.

Then, the terminal device 300 implements each of the steps described above repeatedly until a piece of the concert history of which the taste information is unset disappears, and generates concert participation information 704a including taste information of the user like that shown in FIG. 28.

Note that, in the description described above, in a case where the heart rate of the user was not less than a threshold in a concert, the terminal device 300 has assessed that the user is fond of the artist related to the concert; however, the present embodiment is not limited to this. For example, the terminal device 300 may vary the threshold with the genre of music pieces. Alternatively, for example, in a case where the genre of music pieces is easy-listening music (light music that can be enjoyed in a relaxed mood), when the heart rate was not more than a threshold in a concert, the terminal device 300 may assess that the user is fond of the artist related to the concert, because the user was relaxed.

As hereinabove, in the present embodiment, the priority can be set in view of not only a past action history of the user and a future action schedule of the user but also taste information of the user based on living body information of the user in a concert that the user participated in, etc. Therefore, music pieces more suitable for the user can be provided by the present embodiment.

Note that, although the description described above uses information of the heart rate as living body information, the present embodiment is not limited to this. For example, the living body information used may be the pulse rate, the blood pressure, the brain waves, the respiration, the perspiration, the myoelectric potential, the temperature of the skin, the electric resistance of the skin, the eyeball movement, the size of the pupil diameter, the steady gaze time, the facial expression, or the like that can be detected by the living body information sensor mentioned above. Further, in the present embodiment, a motion of the user that can be detected by the motion sensor mentioned above (the user's clapping, stepping, or the like during a concert), a voice of the user that can be detected by the sound sensor mentioned above (the user's shout of joy or the like during a concert), or the like may be used instead of living body information.

Figure 29:
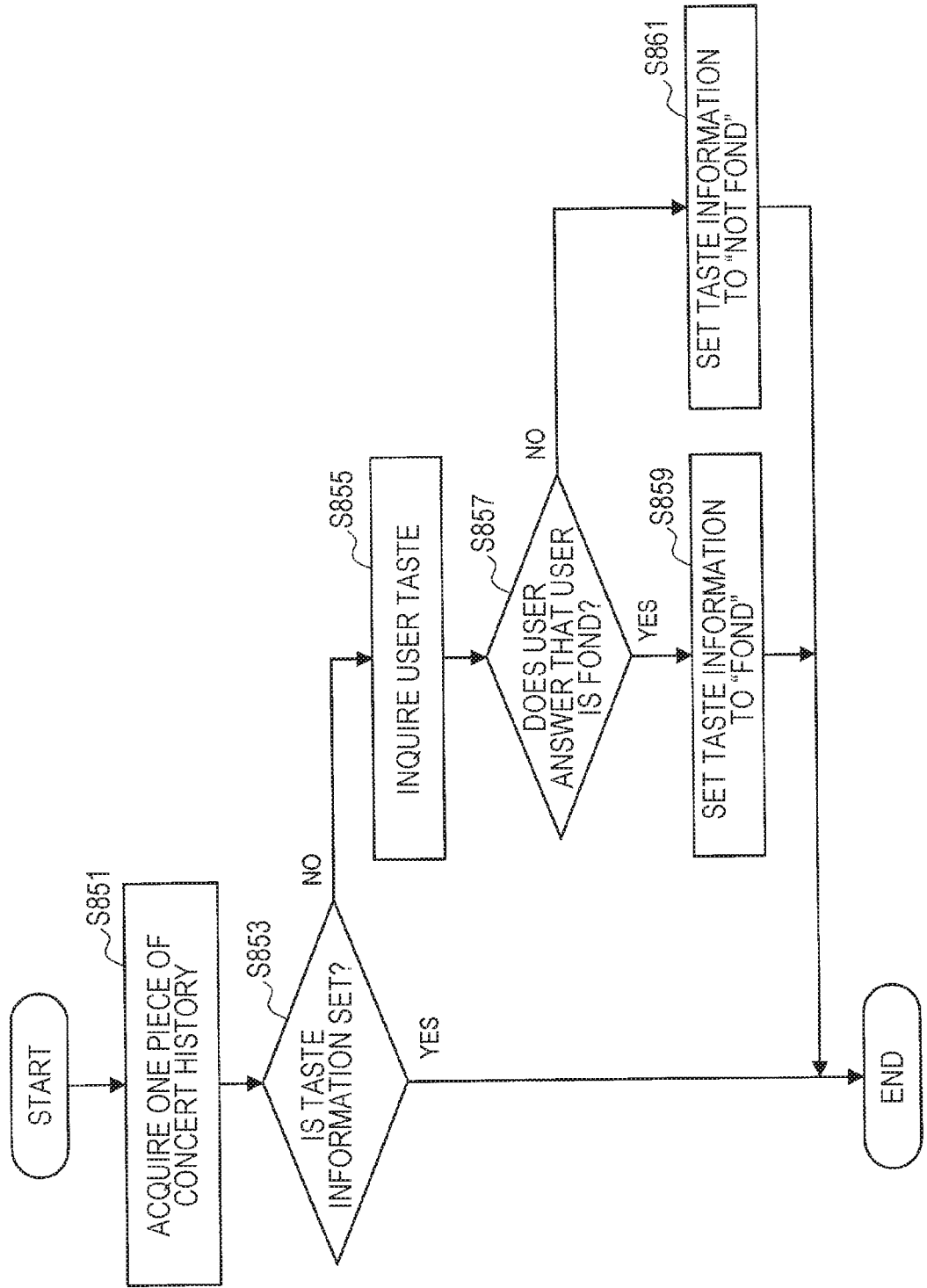
FIG. 29 is a flow chart of a stage of generating taste information of an information processing method according to a modification example of the second embodiment of the present disclosure.
Figure 30:
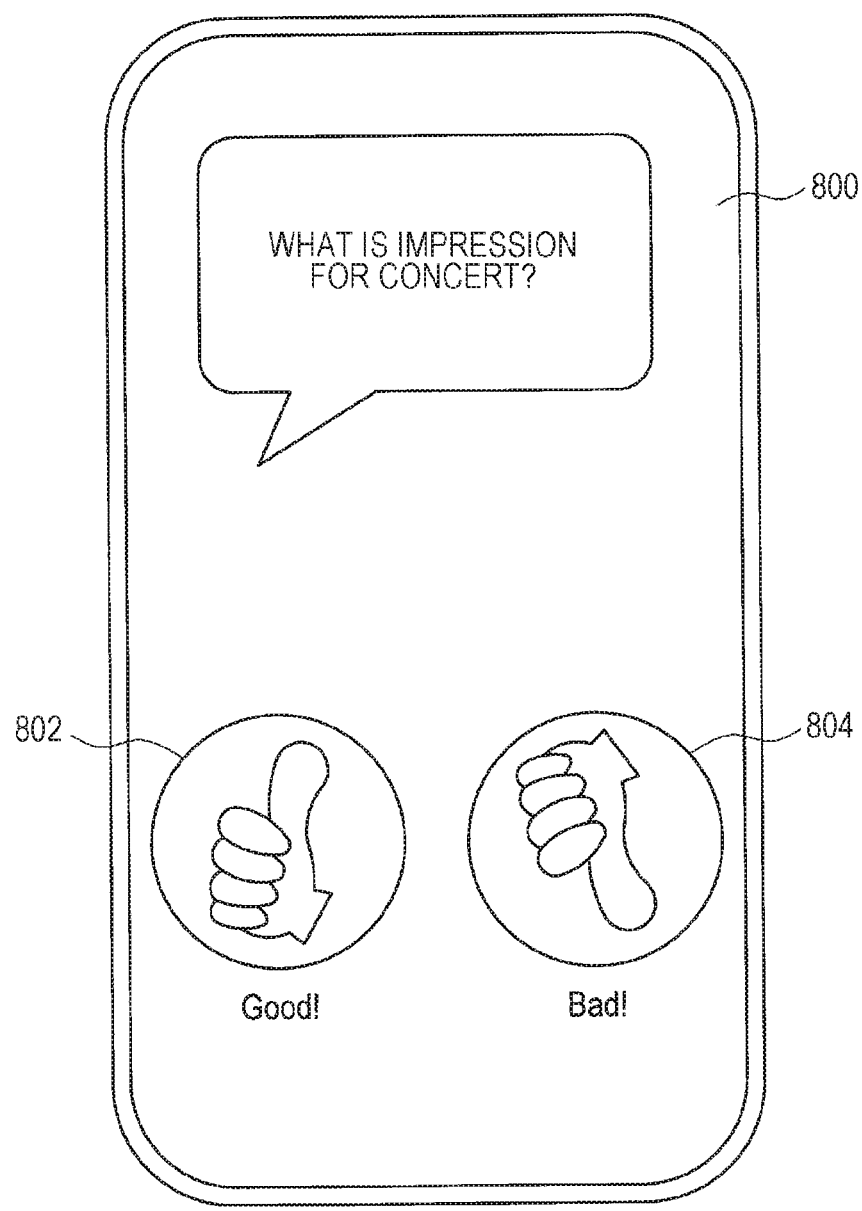
FIG. 30 is a diagram showing an example of a display screen 800 according to the second embodiment of the present disclosure.

Further, in the present embodiment, processing in "the stage of generating taste information" may be modified. For example, in the present embodiment, taste information of the user may be acquired by inquiring of the user whether or not a concert that the user participated in was good and causing the user to input the answer directly. Such a modification example will now be described with reference to FIG. 29 and FIG. 30. FIG. 29 is a flow chart of the stage of generating taste information of an information processing method according to a modification example of the present embodiment, and FIG. 30 is a diagram showing an example of a display screen 800 according to the present embodiment. As shown in FIG. 29, the present Modification example may include a plurality of steps of step S851 to step S861. In the following, details of each of these steps are described. Note that, in the following description, only different points from the present embodiment shown in FIG. 27 described above are described, and a description of points shared by the present embodiment is omitted.

Note that it is assumed that the present modification example is executed on the basis of schedule information of the user, etc. after a concert that the user participated in ended and a prescribed period (for example, immediately after the end of the concert, or after one day has elapsed from the end of the concert) has elapsed. That is, the following processing is executed while the user's memory for the concert that the user participated in is still fresh.

—Step S851—The terminal device 300 acquires the corresponding one piece of the concert history from pieces of the concert history included in the concert participation information 704.

—Step S853—The terminal device 300 assesses whether taste information is not set yet in the piece of the concert history acquired in step S851 described above. The terminal device 300 goes to step S855 in a case where taste information is not set, or ends the processing in a case where taste information is set.

—Step S855—

The terminal device 300 inquires of the user the impression (taste) of the concert related to the piece of the concert history acquired in step S851 described above. For example, the impression (taste) for the concert of the user may be caused to be inputted by displaying a display screen 800 like that shown in FIG. 30 and causing the user to perform an input manipulation on manipulation button 802 or 804. Further, in the present modification example, not only may such a display screen 800 be displayed, but also a question may be outputted by voice to the user from a headphone, a loudspeaker, or the like and an answer of the user may be acquired by a sound pickup device.

—Step S857—

The terminal device 300 goes to step S859 in a case where the user has answered in step S855 described above that the user is fond, or goes to step S861 in a case where the user has not answered that the user is fond.

—Step S859 to Step S861—

These steps are similar to step S809 to step S811 described above, and therefore a description is omitted herein.

(3.1.2 Stage of Performing Processing on History of Concerts)

Figure 31:
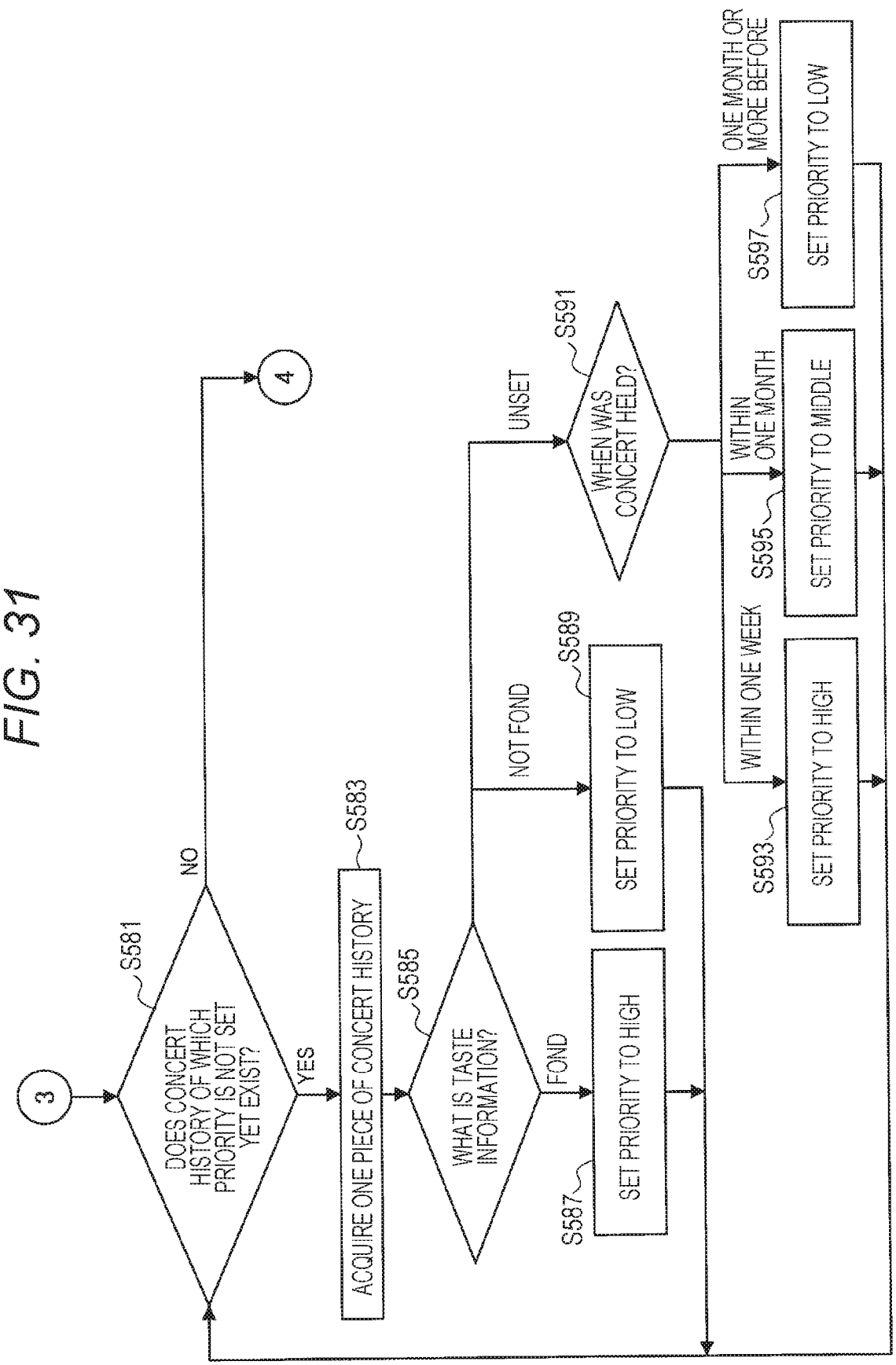
FIG. 31 is a flow chart of a stage of processing a concert history according to the second embodiment of the present disclosure.

Next, an information processing method in "the stage of processing a concert history (step S500)" of the information processing method according to the present embodiment is described with reference to FIG. 31. FIG. 31 is a flow chart of "the stage of processing a concert history" according to the present embodiment. As shown in FIG. 31, "the stage of processing a concert history" may include a plurality of steps of step S581 to step S597. In the following, details of each of these steps are described. Herein, the terminal device 300 generates a priority list 706 in which tastes of the user are reflected regardless of the times of holding of concerts, on the basis of taste information acquired in the above manner. Note that, in the following description, only different points from the first embodiment shown in FIG. 19 described above are described, and a description of points shared by the first embodiment is omitted.

—Step S581—

The terminal device 300 assesses whether or not, with the present time as a standard, a piece of the concert history of which the priority is not set yet and that the user participated in in the past exists in the concert participation information 704. The terminal device 300 goes to step S583 in a case where a piece of the concert history of which the priority is not set exists, or goes to step S600 (the stage of adding music pieces) in a case where a piece of the concert history of which the priority is not set does not exist.

—Step S583—

The terminal device 300 acquires one piece of the concert history from pieces of the concert history of which the priorities are not set and that are included in the concert participation information 704.

—Step S585—

The terminal device 300 checks taste information of the piece of the concert history acquired in step S583 described above, and goes to any of step S587 to step S591 described later in accordance with the taste information. In detail, the terminal device 300 goes to step S587 if the taste information is "fond", goes to step S589 if the taste information is "not fond", or goes to step S591 if taste information is unset.

—Step S587—

This step is similar to step S507 in the first embodiment illustrated in FIG. 19 described above, and therefore a description is omitted herein.

—Step S589—

This step is similar to step S511 in the first embodiment illustrated in FIG. 19 described above, and therefore a description is omitted herein.

—Step S591 to Step S597—

These steps are similar to step S505 to step S511 in the first embodiment illustrated in FIG. 19 described above, and therefore a description is omitted herein.

Furthermore, in the present modification example, the terminal device 300 may include a learning tool (illustration omitted) that performs machine learning of the tendency of the taste of the user by using input information regarding tastes for concerts inputted from the user and living body information corresponding to the periods of the concerts. In this case, even if information of taste is not inputted by the user, the terminal device 300 can infer the taste of the user by acquiring living body information corresponding to the period of the next concert and referring to relationship information that is a result of the machine learning mentioned above and that shows a relationship between the input information and the living body information mentioned above. More specifically, the terminal device 300 performs machine learning of taste information inputted from the user and showing that the user is "fond" of this concert and living body information corresponding to the period of the concert, and extracts features of living body information in a case where the user feels fond. Then, the terminal device 300 acquires living body information corresponding to the next concert period, and compares the living body information with the extracted features mentioned above; thereby, can infer whether or not the user feels "fond" of the concert.

4. Conclusions

As hereinabove, by each embodiment and each modification example of the present disclosure, music pieces suitable for a user can be provided by referring to not only a past action history of the user but also a future action schedule of the user.

Note that each of the embodiments and the modification examples of the present disclosure described above may be implemented singly, or may be implemented in combination with each other, and is not particularly limited.

Further, each of the embodiments and the modification examples of the present disclosure described above is described using, as an example, a case where music pieces suitable for a user are provided; however, the embodiment of the present disclosure is not limited to this. For example, an embodiment of the present disclosure may provide, for example, video contents (moving images or still images) of movies, dramas, dances, various performances, sports, etc. suitable for a user. In such a case, in an embodiment of the present disclosure, priorities are set for artistes and creators regarding events (movies, dramas, dances, various performances, etc.) that the user participated in, the genres of events, etc. (attribute information).

Furthermore, the information processing methods according to the embodiments and the modification examples of the present disclosure described above may be used for, for example, a system including a plurality of devices that is supposed to be connected to a network (or to make communication with each other), like cloud computing or the like. That is, the information processing system 10 according to the present embodiment described above and various devices included in it can also be obtained as, for example, an information processing system that performs processing according to the information processing method according to the present embodiment by means of a plurality of servers on a cloud, or the like.

5. Hardware Configuration

Figure 32:
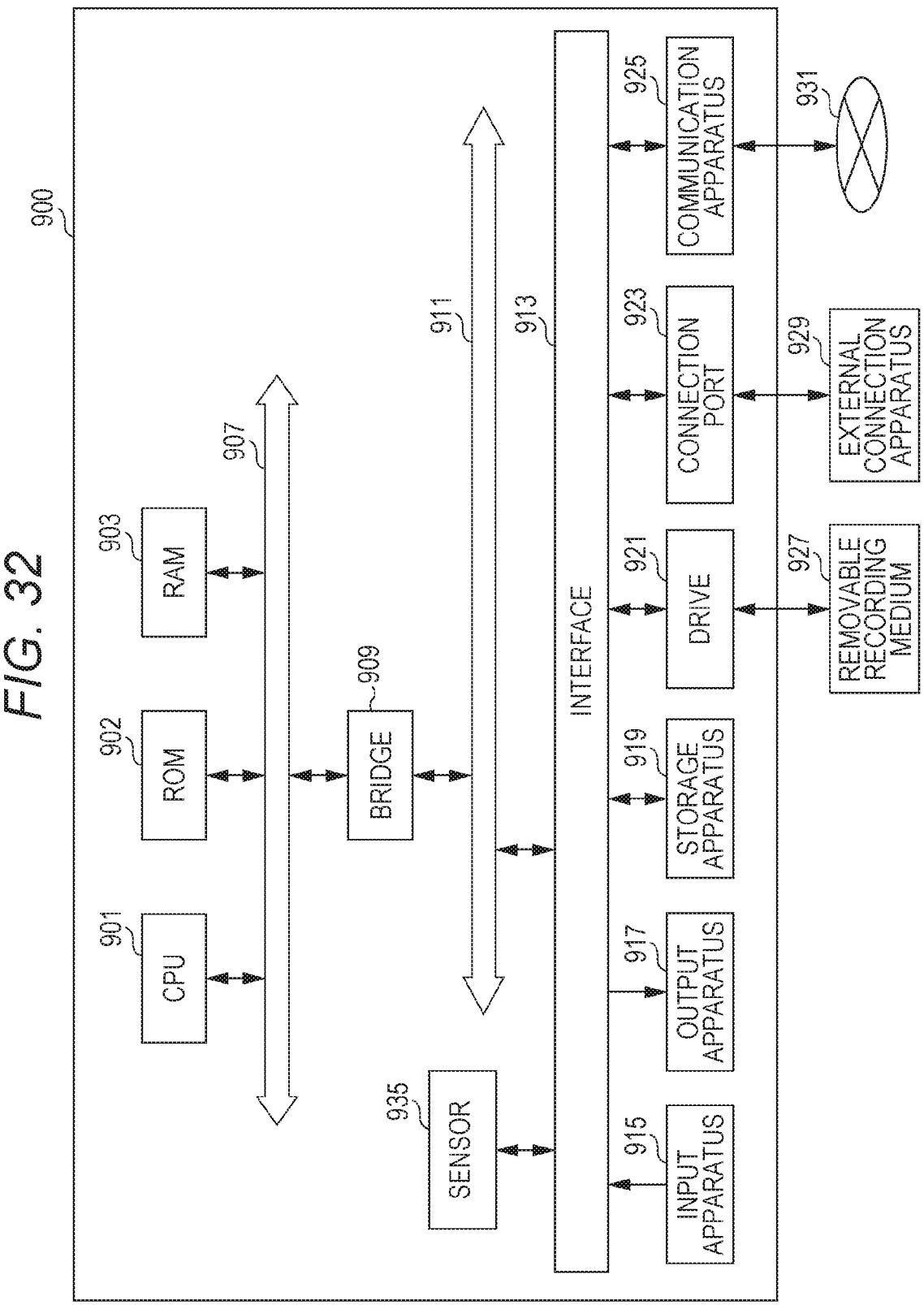
FIG. 32 is a block diagram showing a hardware configuration of an information processing apparatus according to an embodiment of the present disclosure.

Next, with reference to FIG. 32, a hardware configuration of an information processing apparatus according to an embodiment of the present disclosure is explained. FIG. 32 is a block diagram showing a hardware configuration of an information processing apparatus according to an embodiment of the present disclosure. The information processing apparatus 900 illustrated can implement the terminal device 300 in the embodiment described above, for example.

The information processing apparatus 900 includes a CPU 901, read only memory (ROM) 902, and random access memory (RAM) 903. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 900 may include a sensor 935. The information processing apparatus 900 may include a processing circuit such as a digital signal processor (DSP), alternatively or in addition to the CPU 901.

The CPU 901 serves as an arithmetic processing apparatus and a control apparatus, and controls the overall operation or a part of the operation of the information processing apparatus 900 according to various programs recorded in the ROM 902, the RAM 903, the storage apparatus 919, or a removable recording medium 927. The ROM 902 stores programs, operation parameters, and the like used by the CPU 901. The RAM 903 primarily stores programs used in execution by the CPU 901, and various parameters and the like that change as appropriate when executing such programs. The CPU 901, the ROM 902, and the RAM 903 are connected with each other via the host bus 907 configured from an internal bus such as a CPU bus. Further, the host bus 907 is connected to the external bus 911 such as a Peripheral Component Interconnect/Interface (PCI) bus via the bridge 909.

The input apparatus 915 is a device operated by a user such as a button, a keyboard, a touch panel, and a mouse, for example. The input apparatus 915 may be a remote control device that uses, for example, infrared radiation and another type of radio wave. Alternatively, the input apparatus 915 may be an external connection apparatus 929 such as a smart phone that corresponds to an operation of the information processing apparatus 900. The input apparatus 915 includes an input control circuit that generates input signals on the basis of information which is input by a user to output the generated input signals to the CPU 901. A user inputs various types of data to the information processing apparatus 900 and instructs the information processing apparatus 900 to perform a processing operation by operating the input apparatus 915.

The output apparatus 917 includes an apparatus that can output content to a user visually or audibly. The output apparatus 917 may be, for example, a display device such as a liquid crystal display (LCD) or an organic electro-luminescence (EL) display, an audio output apparatus such as a speaker or a headphone, or the like. The output apparatus 917 outputs a result obtained through a process performed by the information processing apparatus 900, in the form of video such as text and an image (including a moving image), sounds such as voice and audio sounds, or the like.

The storage apparatus 919 is an apparatus for data storage that is an example of a storage unit of the information processing apparatus 900. The storage apparatus 919 includes, for example, a magnetic storage unit device such as a HDD, a semiconductor storage device, an optical storage device, or the like. The storage apparatus 919 stores therein various data and the programs executed by the CPU 901, for example, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 903. Further, the drive 921 writes the record into the mounted removable recording medium 927.

The connection port 923 is a port used to connect devices to the information processing apparatus 900. The connection port 923 may be, for example, a Universal Serial Bus (USB) port, an IEEE 1394 port, a Small Computer System Interface (SCSI) port, or the like. Further, the connection port 923 may be an RS-232C port, an optical audio terminal, a High-Definition Multimedia Interface (HDMI) (registered trademark) port, or the like. The connection of the external connection apparatus 929 to the connection port 923 makes it possible to exchange various data between the information processing apparatus 900 and the external connection apparatus 929.

The communication apparatus 925 is a communication interface including, for example, a communication device for connection to a communication network 931. The communication apparatus 925 may be, for example, a communication card or the like for a wired or wireless local area network (LAN), Bluetooth (registered trademark), Wi-Fi, or a wireless USB (WUSB). Further, the communication apparatus 925 may also be a router for optical communication, a router for asymmetric digital subscriber line (ADSL), a modem for various types of communication, or the like. For example, the communication apparatus 925 transmits and receives signals or the like in the Internet or transmits and receives signals or the like to and from another communication device by using a predetermined protocol such as TCP/IP. Further, the communication network 931 connected to the communication apparatus 925 is a network established through wired or wireless connection. The communication network 931 may include, for example, the Internet, a home LAN, infrared communication, satellite communication, or the like.

The sensor 935 includes, for example, various sensors, such as a motion sensor, a sound sensor, a living body information sensor, or a position sensor. Further, the sensor 935 may include a microphone.

The example of the hardware configuration of the information processing apparatus 900 has been described. Each of the configuration elements described above may include a general purpose component or may include hardware specialized for the function of each of the configuration elements. The configuration may be changed as necessary in accordance with the state of the art at the time of working of the present disclosure.

6. Supplements

Note that embodiments of the present disclosure described above can be applied to, in one example, the information processing apparatus as described above or an information processing method executed in an information processing apparatus or an information processing system, a program for causing an information processing apparatus to function, and a non-transitory tangible medium having the program recorded thereon. Further, a program may be distributed via a communication line (including wireless communication) such as the Internet.

Further, the steps in the information processing method of the above-described embodiments of the present disclosure may not necessarily be processed in the described order. For example, the order of the steps may be appropriately modified so that the steps are processed. Further, some of the steps may be processed in parallel or individually instead of being processed chronologically. Moreover, a processing method of the steps may not necessarily be processed in accordance with the described method and may be processed in accordance with another method by other functional units, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

An information processing apparatus including: an information generation section configured to refer to information related to an action history and an action schedule of a user acquired and a database of event content information regarding a plurality of events, and generate profile information of the user while tying together information of stay places in past and future of the user and information of artistes of the events; and an output section configured to set a priority for each of the plurality of artistes on the basis of the generated profile information, and output a content corresponding to each of the artistes in accordance with the priority.

(2)

The information processing apparatus according to (1), in which the action history of the user is acquired by a position sensor configured to detect a position of the user.

(3)

The information processing apparatus according to (1), in which the action history of the user is acquired by specifying the events that the user participated in by using sensing data acquired from a sound sensor configured to detect sound that has occurred around the user and referring to the database.

(4)

The information processing apparatus according to any one of (1) to (3), in which the action schedule of the user is acquired by being inputted in advance by the user.

(5)

The information processing apparatus according to any one of (1) to (4), in which the event content information includes information of a date and a time of holding, a place of holding, and the artiste of each of the events.

(6)

The information processing apparatus according to (5), in which the event content information includes at least any of headings of performed pieces of music, orders of performing the performed pieces of music, genres of the performed pieces of music, or names of creators of the performed pieces of music.

(7)

The information processing apparatus according to (1), in which the information generation section extracts information of stay places in the past and the future of the user on the basis of information related to the action history and the action schedule of the user and specifies the events corresponding to the acquired stay places and extracts information of the artistes corresponding to the specified events, on the basis of the database, and thereby generates the profile information of the user while tying together information of the stay places in the past and the future of the user and information of the artistes of the events.

(8)

The information processing apparatus according to (1), in which the output section outputs the content corresponding to each of the artistes on the basis of a priority order in which the priority is higher for the artiste corresponding to the stay place in the future of the user at a nearest date and time with respect to a prescribed point of time.

(9)

The information processing apparatus according to (1), in which the output section outputs the content corresponding to each of the artistes on the basis of a priority order in which the priority is higher for the artiste corresponding to the stay place in the past of the user at a nearest date and time with respect to a prescribed point of time.

(10)

The information processing apparatus according to (1), in which the output section outputs the content corresponding to each of the artistes on the basis of a priority order in which the priority is higher for the artiste corresponding to the stay place in the past of the user corresponding to a prescribed month and day or at a nearest month and day with respect to a prescribed month and day.

(11)

The information processing apparatus according to (1), in which the output section sets the priority for each of the plurality of artistes on the basis of taste information of the user, and outputs a content corresponding to each of the artistes in accordance with the priority.

(12)

The information processing apparatus according to (11), in which the taste information of the user is inferred on the basis of sensing data acquired by a motion sensor configured to detect a motion of the user or a living body information sensor configured to detect living body information of the user.

(13)

The information processing apparatus according to (11), in which the taste information of the user is acquired by being inputted in advance by the user.

(14)

The information processing apparatus according to (11), in which the taste information of the user is inferred on the basis of relationship information obtained by a learning tool configured to use input information inputted by the user and sensing data that are acquired in a period corresponding to the input information by a motion sensor configured to detect a motion of the user or a living body information sensor configured to detect living body information of the user, and perform machine learning of a relationship between the input information and the sensing data.

(15)

The information processing apparatus according to any one of (1) to (14), in which the output section outputs music or video as the content.

(16)

An information processing apparatus including an information generation section configured to refer to information related to an action history and an action schedule of a user acquired and a database of event content information regarding a plurality of events, and generate profile information of the user while tying together information of stay places in past and future of the user and pieces of attribute information of the events; and an output section configured to set a priority for each of the pieces of attribute information on the basis of the generated profile information, and output a content corresponding to each of the pieces of attribute information in accordance with the priority.

(17)

The information processing apparatus according to (16), in which the pieces of attribute information are creators or genres of created works regarding the events.

(18)

An information processing method including: referring to information related to an action history and an action schedule of a user acquired and a database of event content information regarding a plurality of events, and generating profile information of the user while tying together information of stay places in past and future of the user and information of artistes of the events; and setting a priority for each of the plurality of artistes on the basis of the generated profile information, and outputting a content corresponding to each of the artistes in accordance with the priority.

(19)

A program for causing a computer to execute: a function of referring to information related to an action history and an action schedule of a user acquired and a database of event content information regarding a plurality of events, and generating profile information of the user while tying together information of stay places in past and future of the user and information of artistes of the events; and a function of setting a priority for each of the plurality of artistes on the basis of the generated profile information, and outputting a content corresponding to each of the artistes in accordance with the priority.

REFERENCE SIGNS LIST

10 Information processing system
100 Detection device
110 Sensing section
140 Transmission section
200 Server
210 Input section
220 Control section
230 Memory section
240, 340 Communication section
300 Terminal device
310 Content information acquisition section
320 User information acquisition section
330 Information generation section
350 List generation section
360 Output control section
370 Output section
400 Headphone speaker
500, 931 Communication network
700 Action information
702 Concert information DB
704, 704a Concert participation information
706 Priority list
800 Display screen
802, 804 Manipulation button
900 Information processing apparatus
901 CPU
902 ROM
903 RAM
907 Host bus
909 Bridge
911 External bus
913 Interface
915 Input apparatus
917 Output apparatus
919 Storage apparatus
921 Drive
923 Connection port
925 Communication apparatus
927 Removable recording medium
929 External connection apparatus
935 Sensor

The invention claimed is:

1. An information processing apparatus, comprising:
a central processing unit (CPU) configured to:
control acquisition of:
a database of event content information regarding a plurality of events, and
sensing data from a sound sensor, wherein the sensing data corresponds to environmental sound of a user;
determine participation of the user in a set of events of the plurality of events based on the acquired sensing data and the database of the event content information;
control acquisition of information related to an action history of the user based on the determination of the participation of the user in the set of events;
control acquisition of information related to an action schedule of the user;
extract information of past stay places and upcoming stay places of the user from the information related to the action history and the information related to the action schedule of the user;
generate profile information of the user based on the extracted information of the past stay places and the upcoming stay places of the user and information of a plurality of artistes of the set of events;
set a priority for each artiste of the plurality of artistes based on the generated profile information;
generate, based on the set priority, content corresponding to each artiste of the plurality of artistes; and
control an output device to output the generated content.

2. The information processing apparatus according to claim 1, wherein
the CPU is further configured to control acquisition of the information related to the action history of the user from a position sensor, and
the position sensor to detects a position of the user.

3. The information processing apparatus according to claim 1, wherein the action schedule of the user is input in advance by the user.

4. The information processing apparatus according to claim 1, wherein the event content information includes information of at least one of a date and a time of holding, a place of holding, or an artiste of each of the plurality of events.

5. The information processing apparatus according to claim 4, wherein the event content information includes at least one of headings of performed pieces of music, orders of performing the performed pieces of music, genres of the performed pieces of music, or names of creators of the performed pieces of music.

6. The information processing apparatus according to claim 1, wherein the CPU is further configured to:
specify a set of events of the plurality of events corresponding to the extracted information of the past stay places and the upcoming stay places;
extract information of a set of artistes of the plurality of artistes corresponding to the specified set of events, on a basis of the database, and generate the profile information of the user based on the extracted information of the set of artistes of the set of events.

7. The information processing apparatus according to claim 1, wherein
the CPU is further configured to control, based on a priority order, the output device to output the content corresponding to each of the plurality of artistes,
in the priority order, the priority for a first artiste of the plurality of artistes is higher than the priority for a second artiste of the plurality of artistes, and
the first artiste corresponds to an upcoming stay place of the upcoming stay places at a nearest date and time with respect to a prescribed point of time, among the plurality of artistes.

8. The information processing apparatus according to claim 1, wherein
the CPU is further configured to control, based on a priority order of the plurality of artistes, the output device to output the content corresponding to each artist of the plurality of artistes,
in the priority order, the priority for a first artiste of the plurality of artistes is higher than for a second artiste of the plurality of artistes, and
the first artiste corresponds to a past stay place of the past stay places at a nearest date and time with respect to a prescribed point of time, among the plurality of artistes.

9. The information processing apparatus according to claim 1, wherein
the CPU is further configured to control, based on a priority order of the plurality of artistes, the output device to section output the content corresponding to each artiste of the plurality of artistes,
in the priority order, the priority for a first artiste of the plurality of artistes is higher than the priority for a second artiste of the plurality of artistes, and
the first artiste corresponds to a past stay place, of the past stay places of the user, corresponding to one of a prescribed month and day or at a nearest month and day with respect to the prescribed month and day.

10. The information processing apparatus according to claim 1, wherein the CPU is further configured to set the priority for each artiste of the plurality of artistes based on a basis of taste information of the user.

11. The information processing apparatus according to claim 10, wherein the CPU is further configured to:
control acquisition of at least one of:
motion data from a motion sensor, wherein the motion sensor detects a motion of the user, or
living body information of the user from a living body information sensor, wherein the living body information sensor detects the living body information of the user; and
generate the taste information of the user based on the at least one of the motion data or the living body information of the user.

12. The information processing apparatus according to claim 10, wherein the taste information of the user is input in advance by the user.

13. The information processing apparatus according to claim 10, further comprising a learning tool configured to:
acquire input information input by the user and at least one of motion data from a motion sensor or living body information of the user from a living body information sensor, wherein
the motion data is acquired in a period corresponding to the input information,
the motion sensor detects a motion of the user, and
the living body information sensor detects the living body information of the user; and
execute machine learning of a relationship between the input information and the at least one of the motion data or the living body information to obtain relationship information, wherein the CPU is further configured to determine the taste information based on the relationship information.

14. The information processing apparatus according to claim 1, further comprising the output device configured to output at least one of music or video as the content.

15. An information processing apparatus, comprising:
a central processing unit (CPU) configured to:
control acquisition of:
a database of event content information regarding a plurality of events, and
sensing data from a sound sensor, wherein the sensing data corresponds to environmental sound of a user;
determine participation of the user in a set of events of the plurality of events based on the acquired sensing data and the database of the event content information;
control acquisition of information related to an action history of the user based on the determination of the participation of the user in the set of events;
control acquisition of information related to an action schedule of the user;
extract information of past stay places and upcoming stay places of the user from the information related to the action history and the information related to the action schedule of the user;
generate profile information of the user based on the extracted information of the past stay places and the upcoming stay places of the user and a plurality of pieces of attribute information of the set of events;
set a priority for each piece of the plurality of pieces of attribute information based on the generated profile information;
generate, based on the set priority, a content corresponding to each piece of the plurality of pieces of attribute information; and
control an output device to output the generated content.

16. The information processing apparatus according to claim 15, wherein the plurality of pieces of attribute information are creators or genres of created works regarding the plurality of events.

17. An information processing method, comprising:
controlling acquisition of:
a database of event content information regarding a plurality of events, and
sensing data from a sound sensor, wherein the sensing data corresponds to environmental sound of a user;
determining participation of the user in a set of events of the plurality of events based on the acquired sensing data and the database of the event content information;
controlling acquisition of information related to an action history of the user based on the determination of the participation of the user in the set of events;
controlling acquisition of information related to an action schedule of the user;
extracting information of past stay places and upcoming stay places of the user from the information related to the action history and the information related to the action schedule of the user;

generating profile information of the user based on the extracted information of the past stay places and the upcoming stay places of the user and information of a plurality of artistes of the set of events;

setting a priority for each artiste of the plurality of artistes based on the generated profile information;

generating, based on the set priority, content corresponding to each artiste of the plurality of artistes; and controlling an output device to output the generated content.

18. A non-transitory computer-readable medium having stored thereon, computer-executable instructions which, when executed by a processor, cause the processor to execute operations, the operations comprising:

controlling acquisition of:
- a database of event content information regarding a plurality of events, and
- sensing data from a sound sensor, wherein the sensing data corresponds to environmental sound of a user;

determining participation of the user in a set of events of the plurality of events based on the acquired sensing data and the database of the event content information;

controlling acquisition of information related to an action history of the user based on the determination of the participation of the user in the set of events;

controlling acquisition of information related to an action schedule of the user;

extracting information of past stay places and upcoming stay places of the user from the information related to the action history and the information related to the action schedule of the user;

generating profile information of the user based on the extracted information of the past stay places in past and future the upcoming stay places of the user and information of a plurality of artistes of the set of events;

of setting a priority for each artiste of the plurality of artistes based on the generated profile information;

generating, based on the set priority, content corresponding to each artiste of the plurality of artistes; and controlling an output device to output the generated content.

* * * * *